United States Patent
Chen

(10) Patent No.: US 9,655,219 B2
(45) Date of Patent: May 16, 2017

(54) ON LINE AUTOMATIC DETECTION OF THE TIME PHASE OF THE THRESHOLD VOLTAGE OF A LIGHTING LOAD AND ITS APPLICATION IN LIGHTING MANAGEMENT

(71) Applicant: Chia-Teh Chen, Taipei (TW)

(72) Inventor: Chia-Teh Chen, Taipei (TW)

( * ) Notice: Subject to any disclaimer, the term of this patent is extended or adjusted under 35 U.S.C. 154(b) by 0 days.

(21) Appl. No.: 14/713,030

(22) Filed: May 15, 2015

(65) Prior Publication Data
US 2016/0095187 A1 Mar. 31, 2016

Related U.S. Application Data

(60) Provisional application No. 62/071,644, filed on Sep. 30, 2014.

(51) Int. Cl.
*H05B 37/02* (2006.01)
*H05B 39/04* (2006.01)

(52) U.S. Cl.
CPC .......... *H05B 39/044* (2013.01); *Y02B 20/146* (2013.01)

(58) Field of Classification Search
None
See application file for complete search history.

(56) References Cited

U.S. PATENT DOCUMENTS

| | | | | |
|---|---|---|---|---|
| 6,091,205 A * | 7/2000 | Newman, Jr. | ....... | H02M 5/2573 315/194 |
| 7,164,238 B2 * | 1/2007 | Kazanov | ............ | H05B 37/0227 315/209 R |
| 8,198,820 B2 * | 6/2012 | Weightman | ............ | H05B 39/08 315/209 R |
| 8,228,002 B2 * | 7/2012 | Newman, Jr. | ...... | H05B 33/0845 315/178 |
| 8,310,163 B2 * | 11/2012 | Chen | .................. | H05B 33/0809 315/159 |
| 8,569,956 B2 * | 10/2013 | Shteynberg | .......... | H05B 33/083 315/119 |
| 8,664,881 B2 * | 3/2014 | Newman, Jr. | .......... | H05B 39/04 315/291 |
| 8,736,193 B2 * | 5/2014 | Gallo | ................. | H05B 33/0815 315/291 |
| 9,345,112 B2 * | 5/2016 | Chen | .................... | H03K 17/133 |

\* cited by examiner

*Primary Examiner* — Alexander H Taningco
*Assistant Examiner* — Nelson Correa
(74) *Attorney, Agent, or Firm* — Li & Cai Intellectual Property (USA) Office

(57) ABSTRACT

The present disclosure discloses a method based on microcontroller circuit and software codes to on line automatically detect the time phase of the threshold voltage of a lighting load in each AC half-cycle. This automatic detection capability enables a dimmer circuit of a lighting apparatus to establish a dimmer working range from the self-detected time phase of threshold voltage of the lighting load. The lighting apparatus can be operated with different types of lighting loads to perform a full dimming range from 0% to 100% of maximum lighting output. Therefore, the dimmer circuit makes possible both the lighting fixtures and the users refrained from dimming difficulties caused by different types of lighting loads with different threshold voltages. The design concept can be extended to manage illuminations in a two-level security light on a simple software basis without resorting to complex electric circuits.

24 Claims, 19 Drawing Sheets

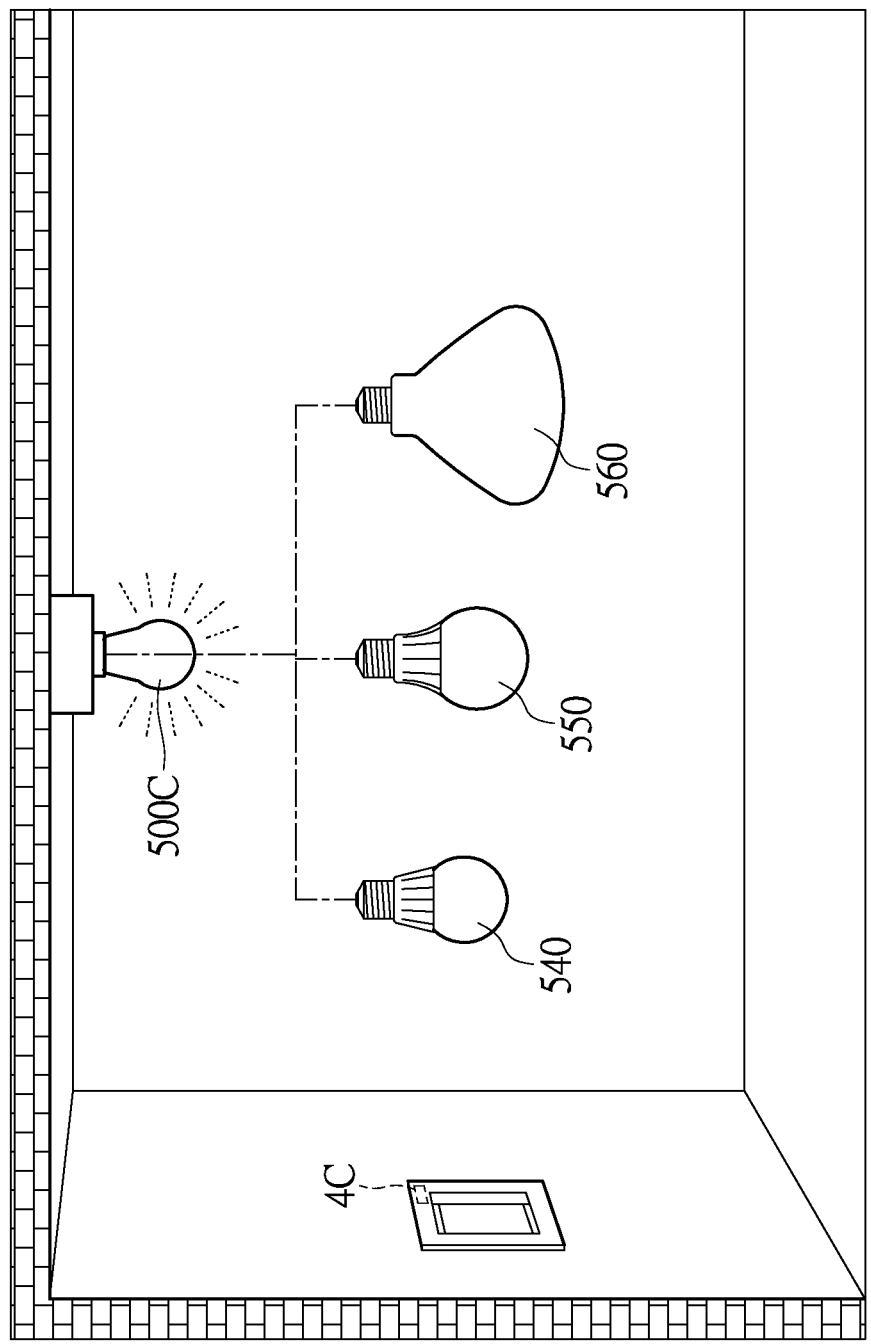

ON LINE AUTOMATIC DETECTION OF THE TIME PHASE OF THE THRESHOLD VOLTAGE OF A LIGHTING LOAD AND ITS APPLICATION IN LIGHTING MANAGEMENT

CROSS-REFERENCE TO RELATED APPLICATIONS

This application claims priority to U.S. Provisional Patent Application No. 62/071,644, filed on 2014 Sep. 30 on behalf of CHIA-THE CHEN, the disclosure of which is incorporated herein by reference in its entirety.

BACKGROUND OF THE INVENTION

1. Field of the Invention

The present disclosure relates to automatic detection of electric threshold conduction of lighting load and its application.

2. Description of Related Art

A dimmable lighting apparatus installed outdoors or indoors always comprises lighting bulb(s) with a dimmer circuit. The dimmer circuit is used to control light intensity of electric bulb commonly for energy-saving, creating an aesthetic atmosphere or providing security lighting purposes. In general, the dimmer connected in-series with alternating-current (AC) lighting bulb and AC power is a conductive phase angle control circuit composed of a triac device and a trigger means. Dimmer circuit of this art is disclosed for example in U.S. Pat. No. 5,598,066, where an analog circuitry is used to implement a two-level security light. The analog dimmer circuitry employs a triac device which can be bi-directionally triggered into conduction for a time period during positive and negative half-cycle of AC power. The conduction time period manageable by trigger time point is here referred to as conductive phase angle of AC half-cycle. In the two-level security light, the triac device controls conductive phase angle to regulate electric current flowing through a lighting bulb for a long or a short time period during each AC half-cycle, to respectively render the lighting bulb emitting a high or a low level light intensity. An improved analog version based on conductive phase angle control is further disclosed in U.S. Pat. No. 6,225,748 B1 in which a short conductive period controlled by the triac device can be continuously varied in a small range such that the low level light intensity of the AC lighting bulb is adjustable.

Whenever an user trying to replace a burned out AC lighting bulb in dimmable lighting apparatus, the common problem he always faces is the requirement of having to buy exactly the same lighting bulb that was previously used; otherwise the dimming would not perform well, for instance, the light bulb flickers or the bulb illumination cannot be smoothly varied by a dimming operation. In view of such inconvenience, a universal dimmer that can be equally operable for different type bulbs may be highly welcome. Effort in this direction is for example in U.S. Pat. No. 8,198,820 B2 where a dimmer circuit operable on both incandescent and fluorescent lamps is disclosed. This dimmer circuit uses controller circuitry to automatically detect whether an incandescent or a fluorescent bulb is connected with the dimmer, and then to conduct corresponding dimming work. There was no mention about how the dimmer circuit can manage the variation of threshold voltage among different brands of fluorescent bulbs.

The dimmers of prior art are generally constructed by analog electric circuitry that may be complex in system structure and lacks flexibility due to its hardware nature. In U.S. Pat. No. 8,310,163 B2 a digital-type dimmer circuit is disclosed; the circuit uses programmable digital device, for example, microcontroller, to control the conductive phase angle of a triac device, and therefore to manage the illumination intensity of a lighting bulb. A specialty of this art is using program codes to control illumination. Thus, the circuit construction is much simpler than that of the analog-type dimmer. Further, the lighting control can be done with high accuracy defined by the program codes. If extra dimmer function is desired, it needs solely to modify program codes such that circuit hardware remains unchanged.

FIG. 1A shows block diagram of a microcontroller-based dimmer that works on the principle of conductive phase angle control. The dimmer of FIG. 1A comprises a bidirectional control switch 11, a microcontroller (MCU) 12, a zero-crossing-point detector 13 and an external control unit 14. The bidirectional control switch 11 is preferable a triac. For lighting control, an AC lighting bulb or a lighting load 2 is connected in-series to the bidirectional control switch 11 and AC power source 3. The external control unit 14 is used as a communication interface between microcontroller 12 and user. The microcontroller 12 and the zero-crossing-point detector 13 build a trigger circuit. In accordance with user's instructions sent from the external control unit 14, the trigger circuit generates in each AC half-cycle a trigger signal to turn on the bidirectional control switch 11, such as to control the conductive phase angle or the conductive time period in each AC half-cycle. Corresponding to the conductive time period, an average AC electric power is delivered through the bidirectional control switch 11 to the lighting load 2 to generate light with intensity in proportion to the average AC power.

With technology advance of lighting bulbs, the dimmer design may encounter difficulties caused by different properties of lighting bulbs produced by new technology. Technically, the lighting bulbs in daily use are AC electric loads with two terminals. FIG. 1B illustrates respectively in drawings (a)-(c) three non-incandescent light bulbs for directly plugging in AC socket, each has terminal voltage V and terminal current I as indicated. They are: (a) screw-in compact fluorescent bulb, (b) two-terminal ACLED module, having two light-emitting diodes (LEDs) connected in-parallel and arranged with reverse polarity, and (c) screw-in LED bulb. FIG. 1B (d) illustrates a built-in circuit in a screw-in LED bulb. Please refer to drawings (c) and (d) of FIG. 1B. Generally, a screw-in LED bulb is composed of a full-wave rectifier D1-D4 and a plurality of LEDs. The LEDs are connected in series and attached to the output port b-b' of the full-wave rectifier. The input port a-a' of the full-wave rectifier is either directly or via a voltage reduction branch C1-R connected to an AC power source. The capacitor C2 and the Zener diode ZD are used to maintain a quasi constant voltage applied on the series-connected LEDs. The LED, like a common diode, needs a cut-in voltage to begin conducting electric current. It can infer from such a diode property that a threshold voltage in proportion to the number of the LEDs is required to turn on the series-connected LEDs. Thus, except that the terminal voltage V of the screw-in LED bulb exceeds the threshold voltage, the series-connected LEDs are cut-off such that the terminal current I is zero. Similar electric conduction behavior resulted from threshold voltage is also observed in fluorescent lamp and ACLED module despite different constructions.

Please refer to FIG. 2. The three lighting bulbs of FIG. 1B can be equally represented by a two-terminal electric element with electric property as illustrated respectively in drawings (a) and (b) of FIG. 2. The electric element has two terminals A and A'. When measuring voltage V and current I at the terminals A-A', the electric element reveals a nonlinear relation between current I and voltage V as shown in (b) of FIG. 2. The terminal current I begins to increase sharply when the terminal voltage V varies along the voltage axis and exceeds a threshold voltage Vt for both positive and negative polarity. By contrast, if the terminal voltage is limited in a domain ranging from −Vt to Vt, the terminal current I is nearly zero. It means that an AC lighting load having such nonlinear I-V curve can conduct electric current and emit light only when an instant AC voltage is greater than the threshold voltage Vt; otherwise, the lighting load is turned off completely. The threshold voltage Vt of new-generation lighting bulb such as LED is large, for instance, Vt>80 V in ACLED module and screw-in LED bulb. In comparison, a conventional incandescent bulb has a relatively linear I-V characteristic; it emits light starting instantly from zero terminal voltage.

Reference is made to FIG. 3. FIG. 3 shows signal waveforms (a)-(c) for dimmer operation specifically concerned with dimmer of FIG. 1A and the lighting load of FIG. 2. The waveform (a) represents sinusoidal AC voltage variation of an AC power source 3. The waveform (a) of AC voltage has amplitude Vm and half-cycle period T. For easy explanation, consider only the positive half-cycle of the AC voltage. Along the time axis, the first zero-crossing point is indicated as t=0 and the second zero-crossing point is as t=T. If a lighting load 2 having threshold voltage Vt is connected via a bidirectional control switch 11 to the AC power source 3, it remains cutoff respectively for the time periods ranging from t=0 to t=$t_{D0}$ and from t=T−$t_{D0}$ to t=T, where $t_{D0}$=(T/π) sin−1 (Vt/Vm), no matter whether the bidirectional control switch 11 is triggered or not. Accordingly, t=$t_{D0}$ is the time point measured from the first zero-crossing point when the instant AC voltage is equal to the threshold voltage Vt; the parameter $t_{D0}$ defined on the time axis is the time phase of the threshold voltage Vt. In other words, only in a time period from t=$t_{D0}$ to t=T−$t_{D0}$ the AC voltage exceeds the threshold voltage Vt with sufficient magnitude to hold the lighting load 2 in conduction state. Similar description can be equally applied to the negative half-cycle of the AC voltage.

The waveforms (b) and (c) in FIG. 3 represent two different voltage signals generated from microcontroller 12 shown in FIG. 1A, for triggering and bringing the bidirectional control switch 11 into conduction. The waveforms (b) is a pulse-width-modulation (PWM) signal synchronizing with the waveform (a) of AC voltage; the PWM signal uses a high voltage to turn on the bidirectional control switch 11 in each AC half-cycle, such that its front edge with a time delay $t_D$ counted from the zero-crossing point of the AC voltage can be considered as the trigger time point to turn on the bidirectional control switch 11. The bidirectional control switch 11 has thus a conductive time period given by T−$t_D$ manageable by varying the time delay $t_D$ in each AC half-cycle.

Because of the series connection as shown in FIG. 1A, the lighting load 2 emits light under condition that both the lighting load 2 and the control switch 11 conduct electric current at the same time. By examining the waveforms (a) and (b) in FIG. 3, a common time domain exists for both components 2 and 11 being conductive. This common time domain demands that the PWM signal should be generated with its time delay $t_D$ limited in a range: $t_{D0}$<$t_D$<T−$t_{D0}$. An AC power is then effectively transmitted via the bidirectional control switch to the lighting load for a time period of T−$t_{D0}$−$t_D$ in each AC half-cycle. The illumination power of the lighting load is therefore determined by the conductive time period T−$t_{D0}$−$t_D$. In this context, the illumination intensity of a lighting load is manageable by varying the time delay $t_D$ of the PWM signal generated by microcontroller circuitry in each AC half-cycle.

From the above account, the threshold voltage Vt of the lighting load imposes a constraint on generating PWM signal to turn on both the lighting load and the control switch at the same time. The lighting load with threshold voltage Vt has two non-conductive phase zones adjoining zero-crossing points in each AC half-cycle. The PWM signal for conductive phase angle control should take these two non-conductive phase zones into account and keep technically its front edge with a time lag of $t_D$ after the zero-crossing point of the AC voltage in a time range: $t_{D0}$<$t_D$<T−$t_{D0}$, to ensure stable light dimming operation. This constraint has been disclosed in U.S. Pat. No. 8,310,163 B2. Because of different threshold voltages, the dimmer designed for a lighting load would not be likewise operable for another lighting load. Usually, as a safe measure to ignore the condition $t_{D0}$<$t_D$<T−$t_{D0}$, the dimmer designer takes deliberately a large time delay $t_D$ to mitigate any effects caused by the threshold voltage. For instance, the waveform (b) in FIG. 3 is the PWM signal with a time delay $t_D$ roughly equal to T/2, where an instant AC voltage, namely, the AC amplitude Vm, is greater than the threshold voltage Vt to secure a smooth dimming or flickering-free state of the lighting load; under this condition the lighting load delivers 50% intensity of the full power illumination. The waveform (c) in FIG. 3 is a constant high voltage in such a way to automatically bring both the control switch 11 and the lighting load 2 into conduction when the instant AC voltage surpasses the threshold voltage Vt in each AC half-cycle; under this condition the lighting load delivers 100%-intensity of illumination. The circuit design using trigger signals like waveforms (b) and (c) in FIG. 3 is employed vastly in conventional dimmers. However, if precise and special illuminations are demanded, such as an illumination with adjustable intensity level, or an illumination of gradually changing brightness between two predetermined levels (soft start/soft end), the conventional dimmers would not work with success if lighting loads are different types and brands manufactured from different factories.

In summary, the non-conductive phase zones caused by the threshold voltage of a lighting load are crucial to dimmer operation. Therefore, the dimmer circuit designed for operating one specific brand of lighting load may not work well for operating other brands, due to the variations of the threshold voltage and other electric parameters. In dimmer design, the engineers take usually a strategy to secure that the triac device is triggered into conduction at a time phase when the instant AC voltage safely exceeds the threshold voltage. A sufficient time phase cushion is thus designed to accommodate variations of threshold voltages among different light bulbs. However, such an endeavor may be at the cost of the limited dimming capability ranging generally from nearly 50%- to 100%-brightness of the full power illumination. The attempt to achieve lower than 30% of full power brightness would cause non-performing or flickering of the lighting load.

Another application associated with a dimmable lighting apparatus is to add extra function to make light intensity of the low or the high level illumination adjustable. The two-level lighting management disclosed in U.S. Pat. No. 5,598,066 is restricted to a fixed low level illumination wherein an accent light of low level intensity is automatically turned on at dusk and a high level illumination is turned on upon detection of a motion intrusion. This low level intensity is usually preset by the dimmer manufacturer to yield nearly 50% intensity of the full power illumination. However, it is commonly the case that the end user can best determine the adequacy of the low level lighting for their living environment to create cos y atmosphere and beautiful night view. At 50% intensity for low level the security alert function, the aesthetic night view and the energy saving all are compromised for nothing meaningful. Although in U.S. Pat. No. 6,225,748 B1 an analog circuitry has been disclosed for adjusting low level light intensity, this obsolete technology cannot define precisely the range of adjustability due to the fundamental constraints of analog circuitry. This analog circuitry is also quite cumbersome in performing a simple function which can be easily accomplished by a software program with simple circuit design. An advanced circuit solution other than the prior art to offer adjustability of low or high level illuminations is definitely needed.

SUMMARY OF THE INVENTION

The present disclosure offers an universal solution for dimming management applicable to any AC power based lighting apparatus with any lighting load on an automatic basis. The technology disclosed involves using a microcontroller circuit with software program codes to on line detect the time phase of the threshold voltage of a lighting load installed in a lighting apparatus, wherein the time phase of the threshold voltage is defined by referring to the time location of the threshold voltage on the time axis in each half-cycle period of AC power. With the successful detection of the time phase of the threshold voltage of the lighting load a precise dimmable range can therefore be established to secure a smooth dimming work without the problem of flickering or non-performing. This automatic detection capacity enables the users to choose any type of light bulbs for an installed lighting apparatus for either first time use or for replacement need without restriction.

The problems causing the performance failure of dimming function for any lighting apparatus with an AC lighting load are either due to the change of threshold voltage when the consumers replace a burned out bulb with a different bulb from different manufacturer, or change of AC power source with different voltage amplitude, or simply the inability to precisely locate the time phase of the threshold voltage of a complex lighting load. If the time phase or time location of the threshold voltage of a lighting load can be successfully identified on an on line basis, then a safe conduction range can be established in each AC half-cycle period and consequently the microcontroller with program codes is able to generate adequate zero-crossing-point time delay trigger signals with the time delay within such established range to perform a full range dimming. With the invention of the on line detection capacity problems relating to dimming failure caused by uncertainty of threshold voltage can therefore be satisfactorily resolved.

The present disclosure provides a method of on line detecting the time phase of the threshold voltage of a lighting load to work with a dimmer to successfully control the illumination of the lighting load. The dimmer employs a microcontroller with program codes to generate trigger signals with time delay in a time range in each half-cycle period of an AC voltage for controlling the electric power to be delivered to the lighting load. A software method is incorporated into the microcontroller program codes to detect the time phase of the threshold voltage of an AC lighting load and thereby to establish a reliable dimmable range of time period in each half-cycle of the AC voltage for the dimmer to perform a full range dimming from 0% to 100% of maximum light intensity.

In an embodiment according to the present disclosure, a dimmer circuit is connected in series with an AC power source and an AC lighting load. The dimmer circuit is equipped among other components at least with a microcontroller and a lighting load detector as a hardware setup in access to the AC lighting load for monitoring its electric conduction/cutoff status, wherein the microcontroller analyzes the status signals received from the lighting load detector and performs accordingly a search subroutine embedded in a main program to on line detect the time phase of the threshold voltage of the lighting load. The search subroutine carries out a search algorithm in which iteration calculations in conjunction with the status signals received from the lighting load detector are performed. Two embodiments of search algorithm are illustrated in the present disclosure to demonstrate the mechanism of approaching and identifying the time location of the threshold voltage of a lighting load on the time axis in each half-cycle of the AC voltage; one is a domain shrinking scheme and the other one is an incremental scheme.

The iteration calculation of the domain shrinking scheme is designed to identify the time phase or time location of the threshold voltage hidden in a domain established between a lower bound and an upper bound on the time axis in each half-cycle of the AC voltage. The upper bound is always related to a time location where the corresponding AC voltage has an instant magnitude greater than the threshold voltage of the AC lighting load while the lower bound is always related to a time location where the corresponding AC voltage has an instant magnitude smaller than the threshold voltage of the AC lighting load. The process begins with an initial domain of time period between zero which corresponds to the time point where the instant AC voltage is zero and T/2 which corresponds to the time point where the instant AC voltage is the amplitude or the maximum magnitude of an AC voltage (T is the half-cycle period of the AC power source). The time location of the threshold voltage is located somewhere in the initial domain and the subsequent domains updated through the iterative calculation process. The microcontroller repetitively generates a new zero-crossing-point time delay trigger signal with the time delay related to the middle point of the current domain with an effort to shorten the current domain by replacing either the lower bound or the upper bound of the current domain to form a narrower subsequent domain. The decision of which to replace is based on the reaction of the lighting load being either in a conduction state or a cutoff state indicated by status signal received from the lighting load detector. If the status signal indicates the lighting load is in a conduction state, it means the temporal time delay of the trigger signal applied is larger than the time phase of the threshold voltage. The microcontroller then replaces the upper bound of the current domain with the temporal time delay to form a narrower new domain and continue to run the next round of searching. If the status signal indicates the lighting load is in a cutoff state, it means the temporal time delay of the trigger signal is smaller than the time phase of the threshold voltage of the lighting load. The microcontroller in such case will replace the lower bound of the current domain with the temporal time delay of the trigger signal to form a narrower new domain and continue to run the next round of searching. With the execution of the iterative calculation process, the domain wherein the time phase defined by the time location of the threshold voltage is always contained will shrink, and the time length of the domain, namely, the upper bound minus the lower bound, will approach zero after a few rounds of iteration calculations. A minimum time length as a few percentage of the half-cycle period for the converging domain can be preset so that when the time length of a subsequent domain falls into the range of such preset time length the execution of iteration calculations will cease and the then upper bound will be identified as the time phase of the threshold voltage of the lighting load.

The iteration calculation of the other search algorithm is an incremental scheme to gradually increase the time delay of the trigger signal to approach the neighborhood of the time phase of the threshold voltage. When the program codes of the search algorithm are carried out, the microcontroller generates a series of testing trigger signals with increasing time delay starting with a non-zero incremental value. The lighting load detector monitors constantly the conduction/cutoff status of the lighting load whenever a testing trigger signal is activated. The lighting load detector delivers thereof conduction/cutoff status signals recognizable by the microcontroller. The microcontroller generates testing trigger signal with time delay and checks alternately the conduction/cutoff status signal delivered by the lighting load detector. If the status signal signifies a cutoff state of the lighting load, the program codes of the second search algorithm increases the time delay of the testing trigger signal by adding a predetermined small increment to the current time delay. The program codes continue the iteration process by updating time delay increasingly and checking alternately the status signal, until the status signal signifies a conduction state of the lighting load. The iteration process is ended when the microcontroller generates a final trigger signal with a time delay to cause the lighting load detector delivering a status signal to signify a transition of the lighting load from cutoff state to conduction state. The time delay of the final trigger signal is determined by the search algorithm as the time period counted from the zero-crossing point of the AC voltage to the time point when the instant AC voltage is equal to or slightly greater than the threshold voltage of the lighting load. This time delay of the final trigger signal is referred to as the time phase of the threshold voltage of the lighting load. This time phase is then stored in the memory of the microcontroller for updating a data base to be used for establishing a reliable dimmable range in each half-cycle of the AC power source for controlling the illumination of the lighting apparatus. With the capacity of on line detecting the time phase of the threshold voltage of a lighting load the dimming management of an AC lighting load has become much more reliable.

In a preferred embodiment of the present disclosure, a lighting apparatus rendered with the capacity of on line detecting the time phase or time location of threshold voltage can have a photo sensor and a motion sensor integrated with a dimmer circuit to become a two-level security light such that the lighting apparatus is turned on by the photo sensor at dusk to perform a low level illumination mode, and is switched momentarily to a high level illumination mode upon detecting a motion intrusion by the motion sensor. The two-level illumination is controlled by program codes of microcontroller based on the management of conductive phase angle, wherein the conduction degree of the AC lighting load can be adjusted within a dimmable range of time period established by the time phase of the threshold voltage. Accordingly the light intensity of low level illumination mode can be adjusted with an external control unit connected with the microcontroller, in such a way that the conductive phase angle can be continuously varied within the dimmable range following the instruction signal received from the external control unit operated by the user. A low level illumination can thus be freely adjusted by the microcontroller in conjunction with the external control unit. The external control unit serves as an interface between the user and the dimmer circuit. The purpose of including a dimmer circuit in a lighting apparatus is not just for energy saving. In fact, a dimmer circuit is also provided to help creating an esthetic living environment.

The present disclosure with the capacity of on line detection of the threshold voltage of a lighting load provides a technical foundation for resolving all dimming problems due to inability to precisely identify the time phase of the threshold voltage of an AC lighting load. With the help of the present disclosure the dimming management for AC based lighting load has become much more simple and reliable. In fact, the present disclosure is capable of dealing with any kind of lighting loads including incandescent, halogen, compact fluorescent, LED or any other light source featured with a threshold voltage. With the employment of the present disclosure both the lighting manufacturers and the consumers do not have to be concerned about dimming problems caused by different types of lighting load with different threshold voltages. For electronic engineers the circuit design of dimmable lighting products becomes much easier as no matter how complicated the circuit structure is and no matter how many lighting loads are complicatedly connected the method of the present disclosure is able to identify the time phase of the threshold voltage of the lighting system as a whole. The successful detection of the time phase of the threshold voltage enables the microcontroller with program codes to establish a dimmable time period in each half-cycle period of the AC power supply wherein zero-crossing-point time delay signals are safely generated to trigger the conduction of the lighting load to perform a full range dimming without flickering effect.

In order to further the understanding regarding the present disclosure, the following embodiments are provided along with illustrations to facilitate the disclosure of the present disclosure.

BRIEF DESCRIPTION OF THE DRAWINGS

FIG. 14A, FIG. 14B and FIG. 14C respectively shows an universal dimmer diagram in accordance with an embodiment of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

In accordance with the present disclosure, an on line method is provided to detect the time phase of the threshold voltage of a lighting load. A dimmer circuit, connected in-series with the lighting load and an AC power source, is equipped with this on line method to enhance dimmer functionality, such that the dimmer circuit possesses automatic capacity for self-establishing a workable dimming database without concerning with threshold voltage issue resulted from lighting load.

Figure 4A:
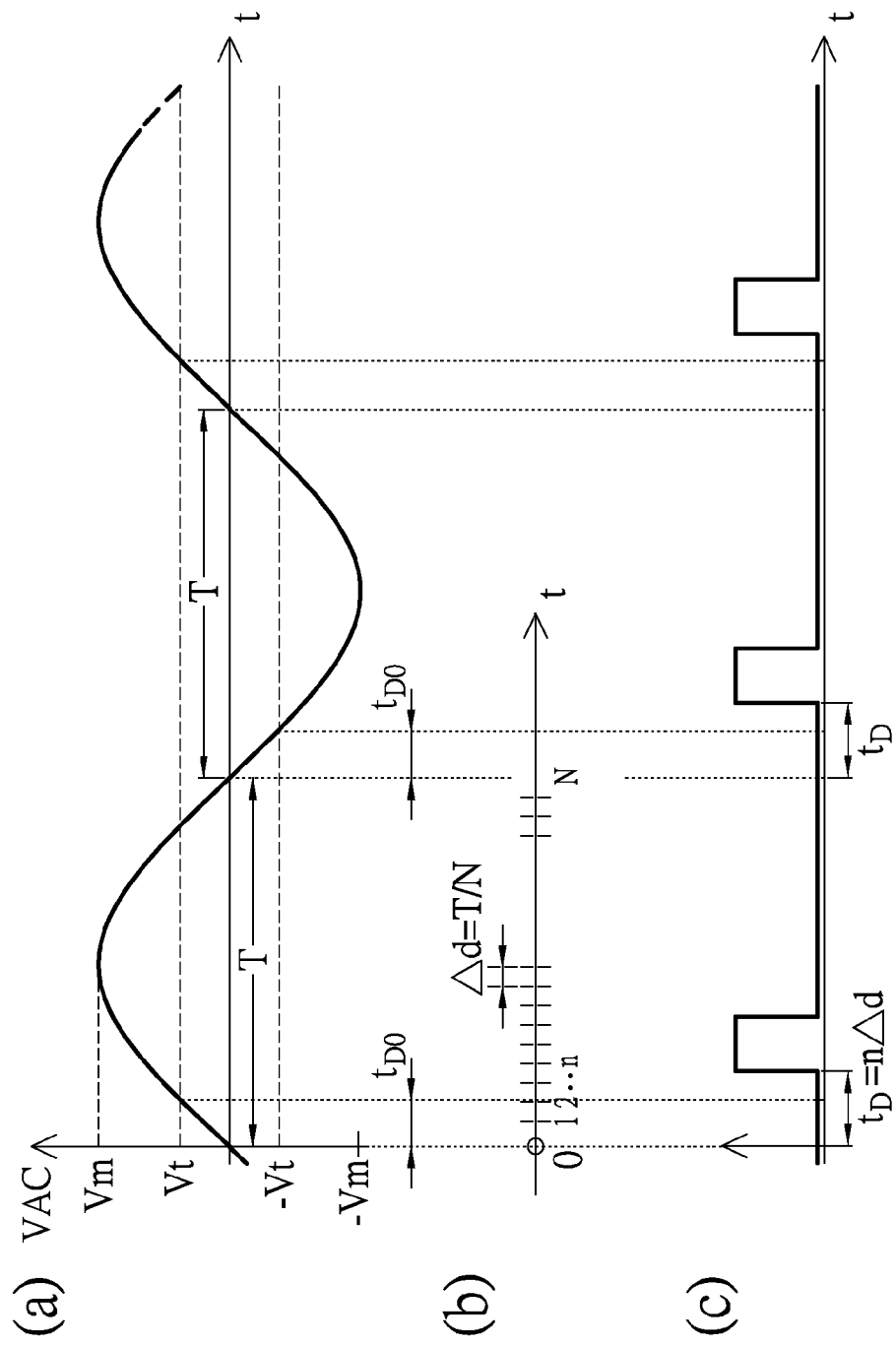
FIG. 4A schematically depicts the signal waveforms related to an incremental scheme in searching the time phase of the threshold voltage of an AC lighting load in accordance with an embodiment of the present disclosure.

Revisit the waveforms of AC voltage and the trigger signal concerned with a dimmer circuit to perform conductive phase angle control. Reference is made to FIG. 4A, where the waveform (a) is a sinusoidal AC voltage having amplitude $V_m$ and half-cycle period T. If a lighting load having threshold voltage $V_t$ is connected through the dimmer circuit to an AC power source, the lighting load has two non-conductive phase zones in each AC half-cycle. For example, in the positive AC half-cycle, the lighting load does not conducts electric current from $t=0$ to $t=t_{D0}$ and from $t=T-t_{D0}$ to $t=T$. Here, the parameter $t_{D0}$, given by $t_{D0}=(T/\pi) \sin^{-1}(V_t/V_m)$, is the time phase of the threshold voltage referred to the AC voltage varying along the time axis in each AC half-cycle. The waveform (c) is a trigger signal, preferable a voltage pulse, generated by the dimmer circuit. The trigger signal has its front edge with a time delay $t_D$ counted from the zero-crossing point of AC voltage in each AC half-cycle. The front edge indicates the time of triggering, and at this time the lighting load may be turned on. When checking the time sequence depicted in waveforms (a) and (c) of FIG. 4A, it can be deduced: (1) if $t_D > t_{D0}$, the lighting load is in conduction since at the time of triggering the instant AC voltage surpasses the threshold voltage $V_t$; (2) if $t_D < t_{D0}$, the lighting load is cut-off since at the time of triggering the instant AC voltage is still smaller than $V_t$. Based on such observation, an on line method can be conceived to determine the time phase $t_{D0}$ of threshold voltage of a lighting load.

The on line method uses a built-in hardware setup, for instance, a voltage or a current sensing circuit constructed in the dimmer circuit, to monitor the electric state of the lighting load when the trigger signal with time delay $t_D$ is generated. The hardware setup generates status signal at the time of triggering to indicate what electric state of lighting load may be; in response to the status signal, the dimmer circuit makes decision to vary the time delay $t_D$ in an appropriate direction. Technically, this time delay $t_D$ can be varied in conjunction with the hardware setup to gradually move into the neighborhood of the time phase $t_{D0}$ along the time axis. It is likely that the hardware setup may detect abrupt change in voltage or current in the lighting load when the dimmer circuit successively generates trigger signals with the time delay $t_D$ sweeping across the time phase $t_{D0}$ to cause the lighting load making transition from either cutoff to conduction, or vise versa. At the moment of detecting electric transition, the dimmer circuit may stop changing the time delay $t_D$ and may conclude that the latest time delay $t_D$ is close to the time phase $t_{D0}$, such that the on line method offers a technique to evaluate an unknown time phase $t_{D0}$ from the known time delay $t_D$ of the trigger signal generated in the dimmer circuit. In technical implementation, the on line method is employed in a dimmer circuit preferably on a software basis in conjunction with the hardware setup built with the dimmer circuit. The software basis may provide program codes with subroutine to perform a search algorithm. The search algorithm is designed to find out the time phase $t_{D0}$ through generating trigger signal with time delay $t_D$ in interaction with electric status signal delivered from the hardware setup, in a manner to steer the time delay $t_D$ approaching the time phase $t_{D0}$. More descriptions of software implementation with search algorithm will be given in the following text.

In a first embodiment according to the present disclosure, the on line method for detecting the time phase $t_{D0}$ may include a hardware setup and a search algorithm utilizing an incremental scheme, wherein the time delay $t_D$ of the trigger signal is adjusted monotonously increasing from the zero-crossing point of AC voltage to approach an unknown time location relating to the time phase $t_{D0}$. The search algorithm is an iteration process by repeatedly executing program codes for generating trigger signal with time delay $t_D$ according to the incremental scheme, and examining at the time of triggering the electric state of the lighting load with the hardware setup. If the electric state is cutoff, the search algorithm adds a small quantity $\Delta d$ to the current time delay $t_D$. The search algorithm resumes the next cycle of iteration by generating trigger signal with updated time delay $(t_D+\Delta d)$ and examining again the electric state of the lighting load. If the electric state is a conduction state, the search algorithm ends the iteration process and determines the current time delay $t_D$ to be the time phase $t_{D0}$ of threshold voltage.

Please refer to FIG. 4A. The illustration (b) of FIG. 4A depicts a time axis for explaining the incremental scheme. Along the time axis, the time delay $t_D$ of the trigger signal increases with a small quantity $\Delta d$ monotonously from one side to approach the time phase point $t_{D0}$. In the first cycle of iteration, the time delay $t_D$ of the trigger signal, as sketched in waveform (c), starts from $t_D(1)=\Delta d$. The time delay $t_D(1)=\Delta d$ may be smaller than the time phase $t_{D0}$ according to the waveform (c) and the illustration (b), such that delay time is updated to $t_D(2)=2\Delta d$ for resuming the second cycle. If upon completing the n-th cycle of iteration, the electric state of the lighting load is still cutoff, the time delay will be updated to $t_D(n+1)=(n+1)\Delta d$. If in the n-th cycle of iteration, the electric state of the lighting load is found to be a conduction state, the algorithm stops the iteration and determines the current time delay $t_D(n)=n\Delta d$ as the time phase $t_{D0}$ of threshold voltage. The accuracy of the on line method to detect the time phase $t_{D0}$ depends on the quantity $\Delta d$ chosen in the search algorithm. The quantity $\Delta d$ is a predetermined factor. As in illustration (b) of FIG. 4A, $\Delta d=T/N$, where T is the AC half-cycle period, N is an integer preset in the search algorithm, for instance, N=100. The quantity $\Delta d$ and integer N can be preset or selected by the user. However, it is not limited so in the present disclosure.

In a second implementation according to the present disclosure, the on line method for detecting the time phase $t_{D0}$ of threshold voltage may include a hardware setup and a search algorithm utilizing a lower bound-upper bound scheme, wherein the time delay $t_D$ of the trigger signal is adjusted stepwise and alternately from two sides to approach an unknown time location of the time phase $t_{D0}$. Here, a strategy is undertaken by firstly surrounding the time location of the time phase $t_{D0}$ with two boundaries of enough separation, respectively referred to as lower bound and upper bound, and then narrowing down the separation stepwise by repeatedly examining the electric state of the lighting load when trigger signal with time delay $t_D$ calculated from the lower bound and the upper bound is activated.

Figure 4B:
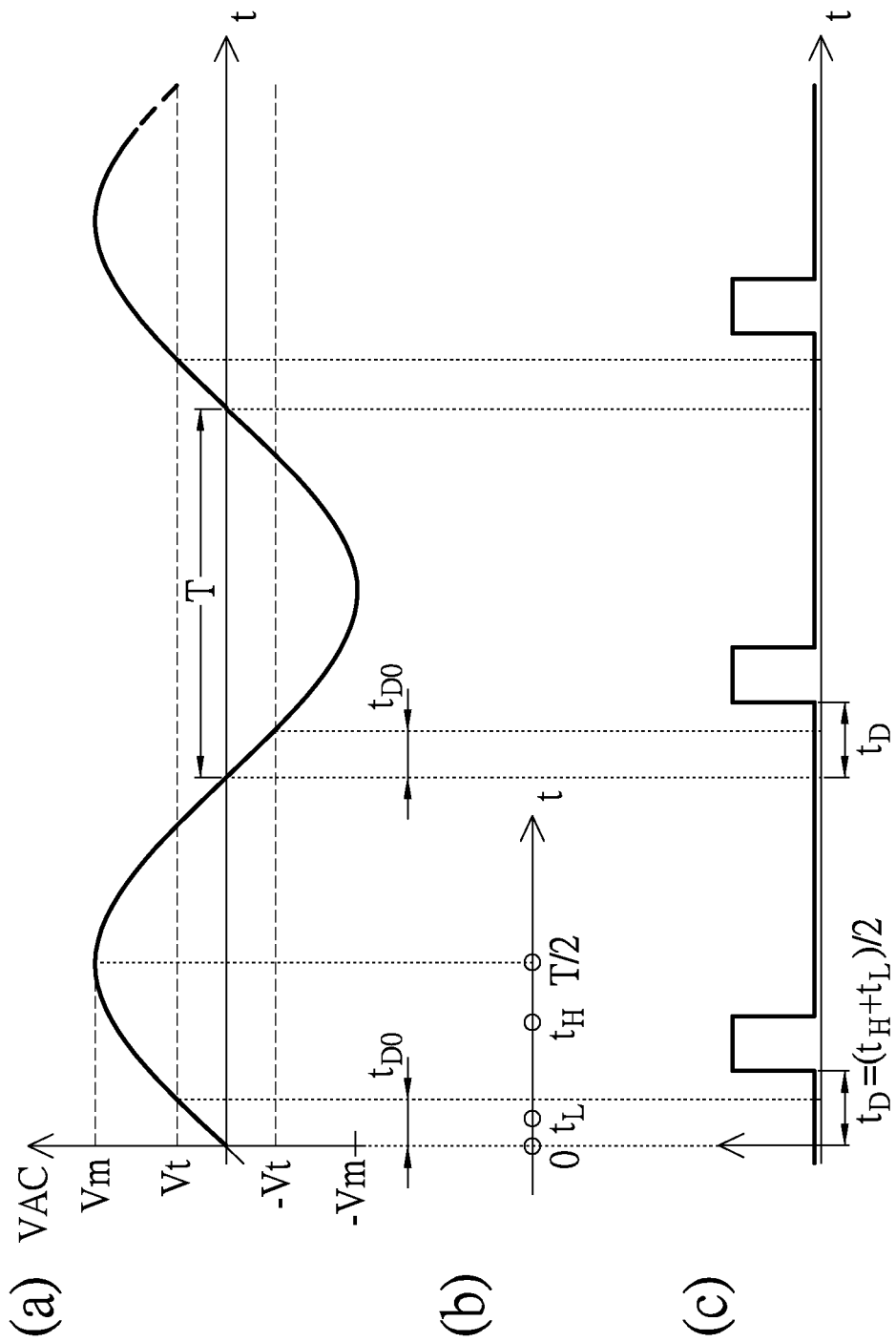
FIG. 4B schematically depicts the signal waveforms related to an upper bound/lower bound scheme in searching the time phase of the threshold voltage of an AC lighting load in accordance with an embodiment of the present disclosure.

For easy explanation, please refer to FIG. 4B. The illustration (b) of FIG. 4B depicts a time axis for explaining the lower bound-upper bound scheme. The waveforms (a) and (c) of FIG. 4B represent respectively the AC voltage and the trigger signal with time delay $t_D$; descriptions for the waveforms (a) and (c) of FIG. 4B like that for FIG. 4A are redundant and omitted. The search algorithm is an iteration process by repeatedly executing program codes to generate trigger signal with time delay $t_D$ according to the lower bound-upper bound scheme, and examining at the time of triggering the electric state of the lighting load with the hardware setup. In a cycle of iteration, the search algorithm executes program codes to generate trigger signal with time delay $t_D$ calculated from a lower bound $t_L$ and an upper bound $t_H$ such as $t_L<t_D<t_H$, and to examine the electric state of the lighting load. Along the time axis, as illustrated in (b) of FIG. 4B, the upper bound $t_H$ begins preferably from T/2, with T being the AC half-cycle period, and the lower bound $t_L$ from zero, such that the time location $t_{D0}$ countered from the zero-crossing point of AC voltage is with safety bounded by $t_H$ and $t_L$. For simplicity, an equation $t_D=(t_L+t_H)/2$ is used in iterative calculation. The calculated $t_D$ is used to discriminatively replace one of the bounds $t_L$ and $t_H$ according to either $t_D>t_{D0}$ or $t_D<t_{D0}$ by examining at the time of triggering the electric state of the lighting load such that the values of $t_L$ and $t_H$ are updated. Upon completing a cycle of iteration, if the difference between $t_L$ and $t_H$ is found to be larger than a preset value, the search algorithm resumes the next cycle of iteration by generating trigger signal with a new time delay $t_D$ calculated from the updated lower bound $t_L$ and upper bound $t_H$ and examining again the electric state of the lighting load. The search algorithm stops the iteration process if the difference between $t_L$ and $t_H$ is under a preset value. The iterative calculations squeeze gradually the two bounds $t_L$ and $t_H$ closely, such that the calculated $t_D$ approaches an upper bound $t_H$ which will be determined as the time phase $t_{D0}$.

For further understanding, the search algorithm based on the lower bound-upper bound scheme uses a recursive relation $t_D(n)=[t_L(n-1)+t_H(n-1)]/2$, for n=1, 2, . . . , N, to carry out iterative calculation, where n denotes the n-th calculation and $t_D(n)$ is a temporary quantity. Further, a hardware setup in connection with this algorithm is mandatory for checking the electric state of the lighting load. Details of this technique will be explained later in conjunction with dimmer circuit. After the n-th calculation, a new bound for $t_{D0}$ is updated according to a rule such that, if $t_D(n)>t_{D0}$, then $t_L(n)=t_L(n-1)$ and $t_H(n)=t_D(n)$; and, if $t_D(n)<t_{D0}$, then $t_L(n)=t_D(n)$ and $t_H(n)=t_H(n-1)$. The new bound of $t_L(n)$ and $t_H(n)$ is then applied to compute $t_D(n+1)=[t_L(n)+t_H(n)]/2$ accordingly. After n times of successive calculations, the difference between the lower bound $t_L(n)$ and the upper bound $t_H(n)$ may shrink approximately with a rate proportional to $1/2^n$. Eventually, with increasing n, the value of $t_D(n)$ which is restricted between $t_L(n)$ and $t_H(n)$ approaches the domain of $t_{D0}$, which leads to ending the repetitive calculation.

Specifically, the iterative calculation begins by assuming $t_L(0)=0$ and $t_H(0)=T/2$ at n=0, where T is the half-cycle period of the AC voltage. It should be noted that $t_H(0)=T/2$ corresponds to an instant AC voltage with value of $V_m$, which is greater than the threshold voltage $V_t$ of lighting load under consideration. This initial condition is therefore applicable to most lighting loads. The iterative calculation is further controlled by a criterion, for example, $0<t_H(n)-t_L(n)<\delta\cdot T$, where $\delta$ is a small number. If the calculation is ended at n=N when $0<t_H(N)-t_L(N)<\delta\cdot T$, the searching is completed with result $t_D(N)\approx t_H(N)=t_{D0}$. The iterative calculations are as follows:

Start from $t_L(0)=0$ and $t_H(0)=T/2$;

$n=1$ Calculate $t_D(1)=[t_L(0)+t_H(0)]/2$;

If $t_D(1)-t_{D0}>0$, then $t_L(1)=t_L(0)$ and $t_H(1)=t_D(1)$;

If $t_D(1)-t_{D0}<0$, then $t_L(1)=t_D(1)$ and $t_H(1)=t_H(0)$;

. . .

$n=N$ Calculate $t_D(N)=[t_L(N-1)+t_H(N-1)]/2$;

If $t_D(N)-t_{D0}>0$, then $t_L(N)=t_L(N-1)$ and $t_H(N)=t_D(N)$;

If $t_D(N)-t_{D0}<0$, then $t_L(N)=t_D(N)$ and $t_H(N)=t_H(N-1)$;

...

The iterative calculation is a convergent process. A straightforward calculation can verify it. For instance, the calculation can be applied to lighting load having arbitrary $t_{D0}$ in a range $0<t_{D0}<T/2$ by using recursive formula $t_D(n)=[t_L(n-1)+t_H(n-1)]/2$ and initial conditions $t_L(0)=0$ and $t_H(0)=T/2$; and a shrinkage of $t_L(n)$ toward $t_H(n)$, checking with a criterion $0<t_H(n)-t_L(n)<0.01\cdot T$, is achieved with n≥5. That means, a result is $t_{D0}=t_H(5)$ after five iteration cycles.

Figure 1A:
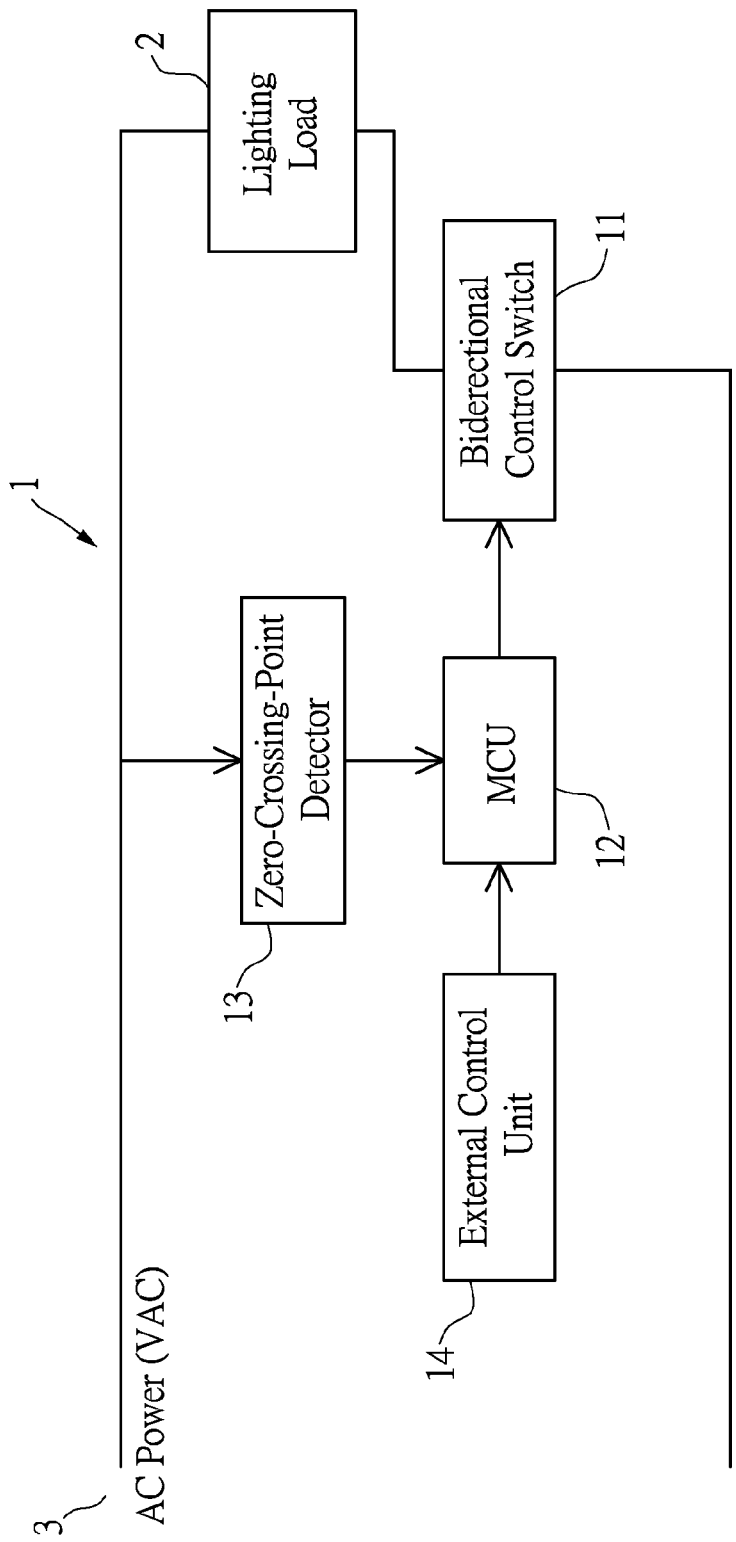
FIG. 1A schematically shows a block diagram depicting the operation principle of a conventional dimmer for AC lighting load.
Figure 1B:
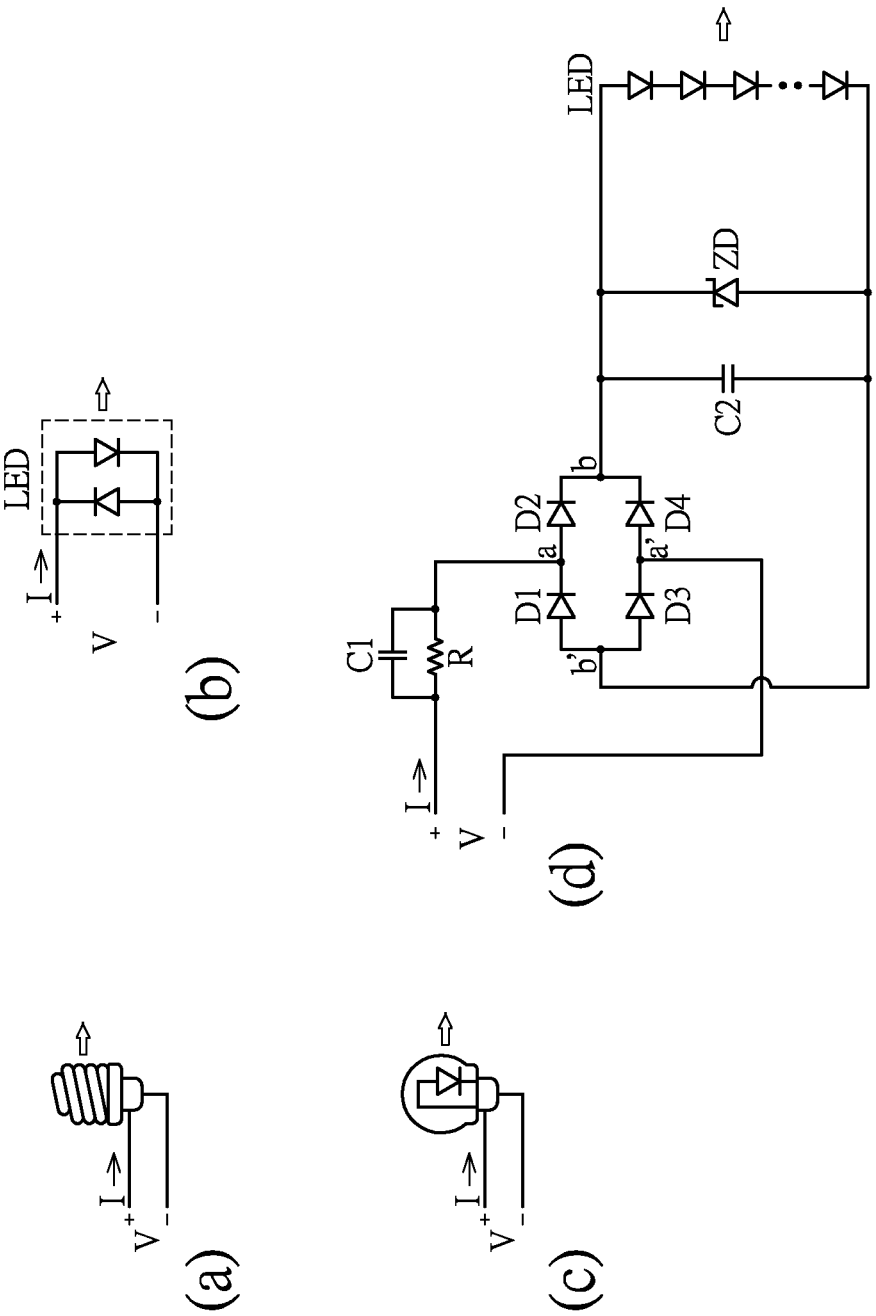
FIG. 1B schematically shows (a) a conventional screw-in compact fluorescent bulb, (b) a conventional ACLED module, (c) a conventional screw-in LED bulb, and (d) circuit within (c) LED bulb.
Figure 2:
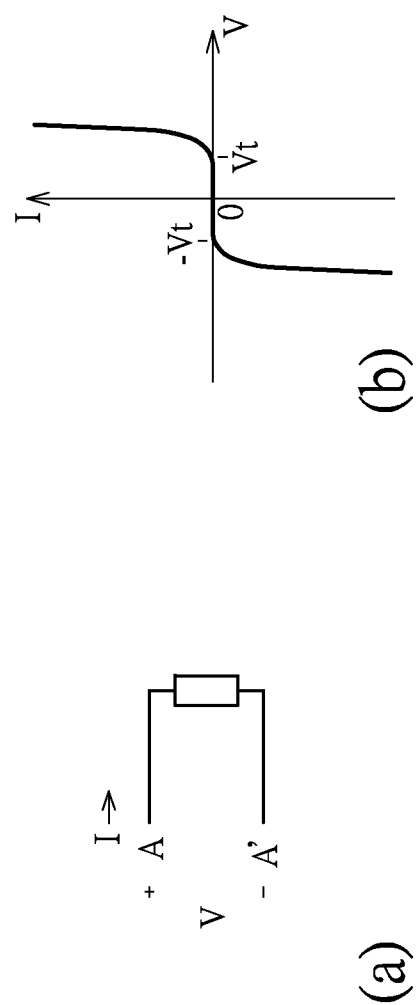
FIG. 2 schematically shows (a) conventional two-terminal AC lighting load and (b) the nonlinear I-V characteristic of the AC lighting load depicted in (a)
Figure 3:
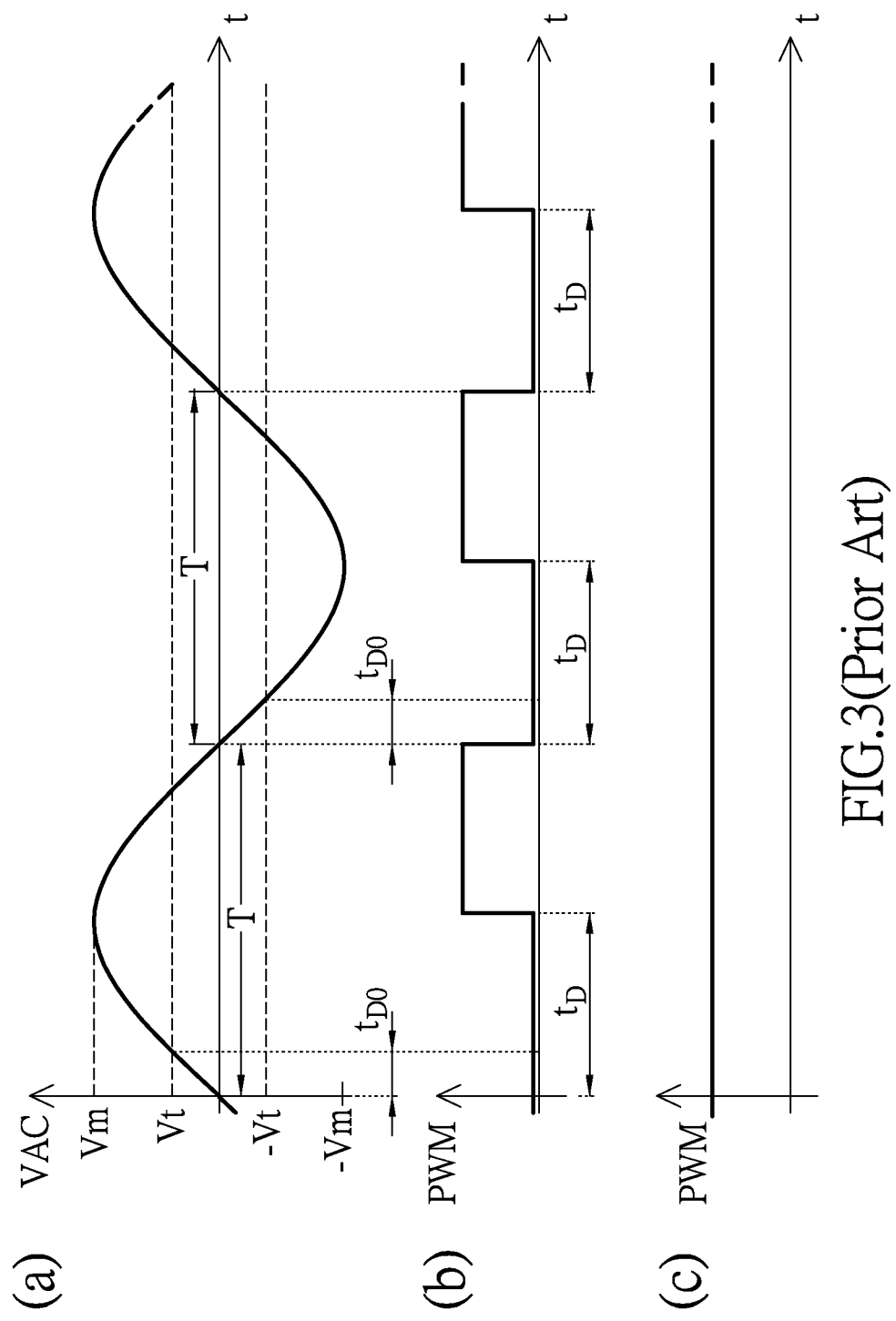
FIG. 3 schematically shows the signal waveforms associated with operation of conventional dimmer for AC lighting load.
Figure 5:
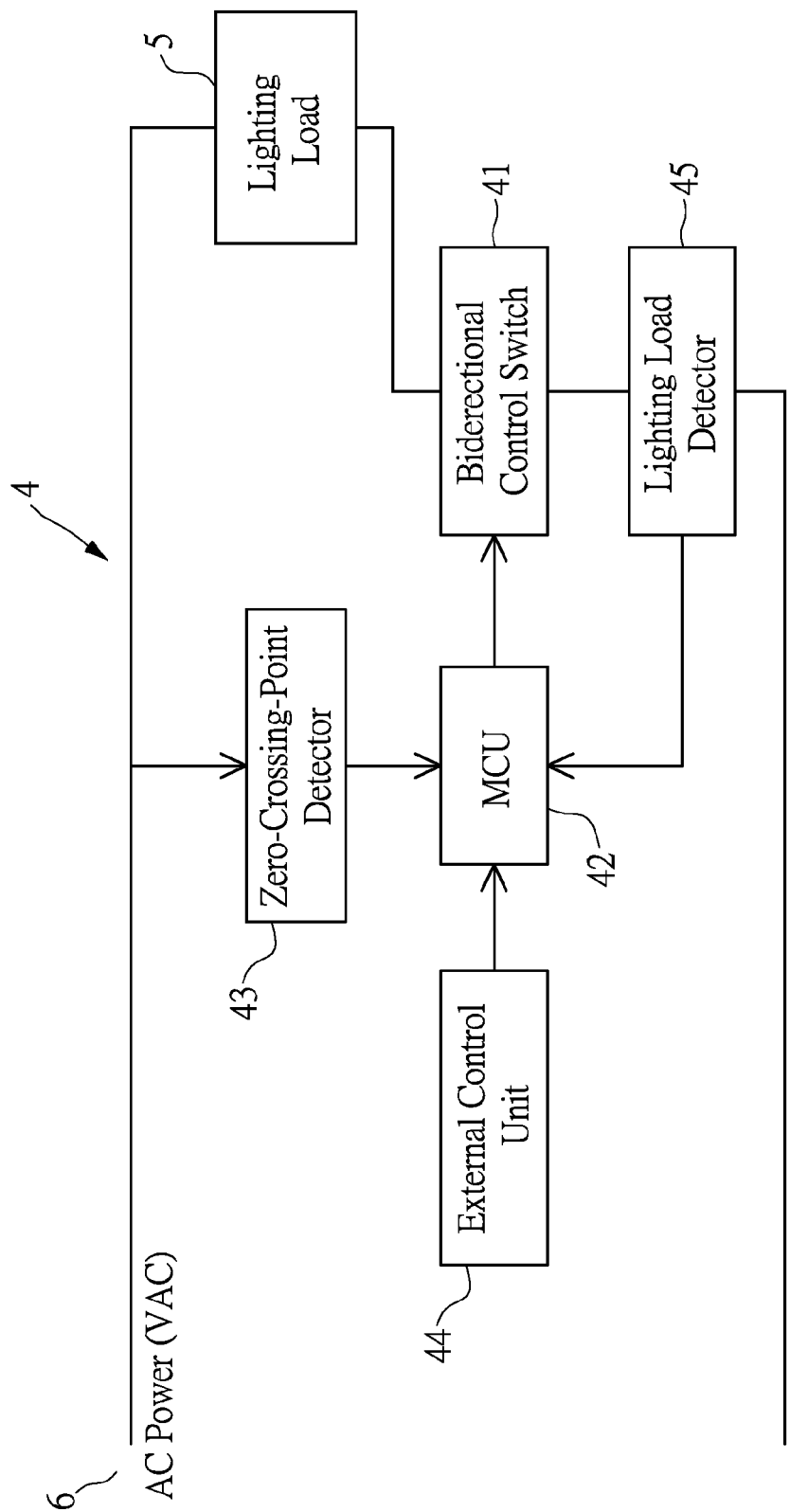
FIG. 5 schematically shows a block diagram depicting a dimmer with method for on line detecting the time phase of the threshold voltage of an AC lighting load in accordance with an embodiment of the present disclosure.

In hardware implementation, FIG. 5 is a block diagram depicting a dimmer circuit 4 in accordance with an embodiment of the present disclosure. Except a lighting load detector 45, the dimmer circuit 4 comprises function blocks like that of FIG. 1A. Description made for FIG. 1A can also be applied to FIG. 5; a general description for FIG. 5 is hence omitted. The lighting load detector 45 is a hardware setup introduced to monitor a lighting load. The lighting load detector 45 may be a voltage or a current sensing circuit. In the case of current sensing circuit, as shown in FIG. 5, the lighting load detector 45 is connected in series with a bidirectional control switch 41, a lighting load 5 and an AC power source 6. However, structure of the lighting load detector does not intend to limit the scope of the present invention. The lighting load detector 45 delivers signal to indicate the electric state of the lighting load 5 on purpose to enable a microcontroller (MCU) 42 to execute program codes for detecting the time phase ($t_{D0}$) of the threshold voltage of the lighting load 5.

Figure 6:
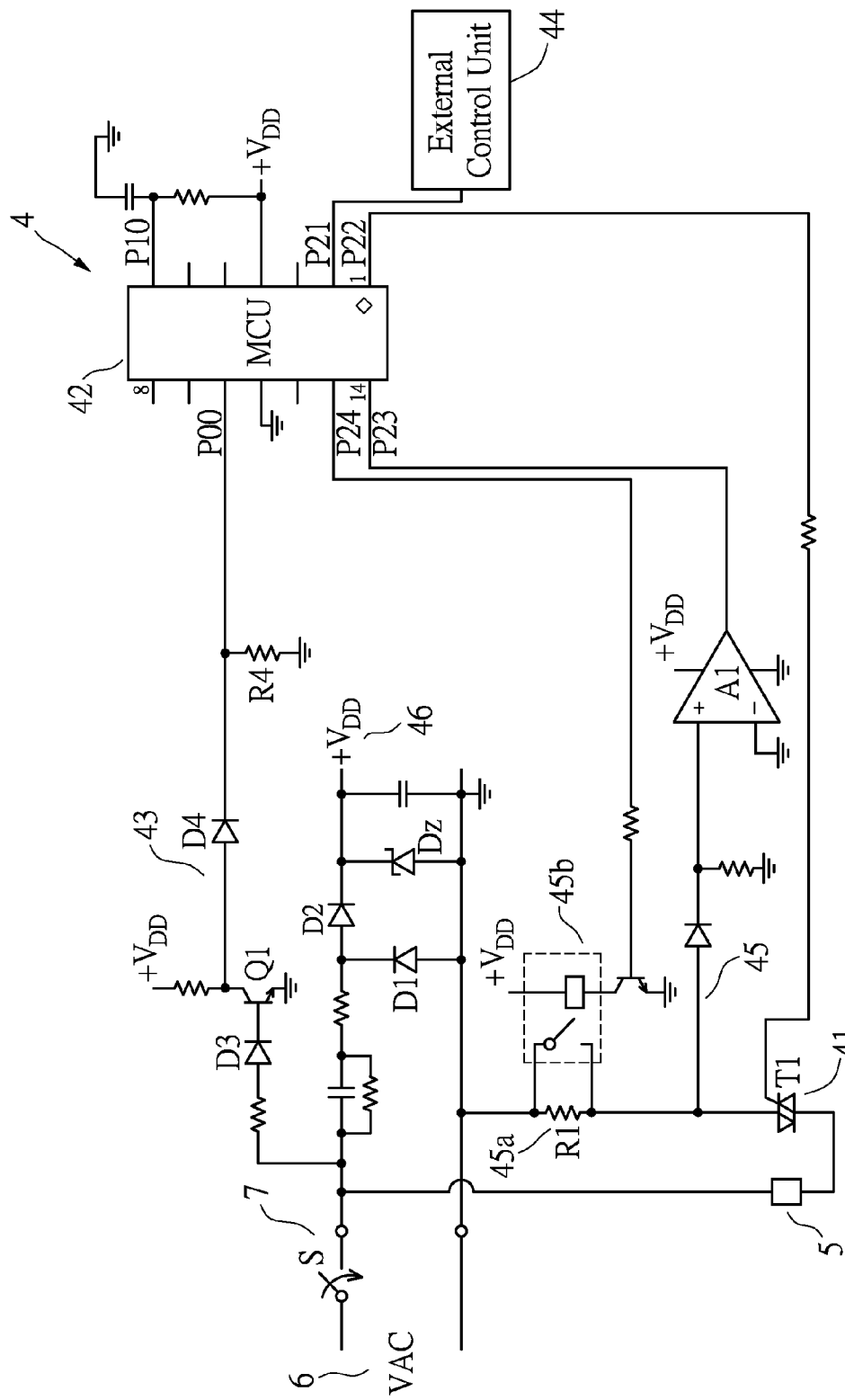
FIG. 6 schematically shows a dimmer circuit diagram in accordance with the block diagram depicted in FIG. 5.

FIG. 6 shows schematically a dimmer circuit constructed according to the function blocks depicted in FIG. 5; the reference numerals used in FIG. 5 are likewise applicable in FIG. 6. In FIG. 6, the dimmer circuit 4 comprises a bidirectional control switch 41, preferable a triac T1, a microcontroller 42, a zero-crossing-point detector 43, an external control unit 44 and a lighting load detector 45. The dimmer circuit 4 is connected with a lighting load 5 and an AC power source 6 in such a way that the lighting load 5, the bidirectional control switch 41, and the lighting load detector 45 are connected in series. The lighting load 5 is preferable an ACLED module or a screw-in dimmable LED bulb. Further, an external control unit 44 is used to communicate dimmer circuit with user for configuring or presetting circuit. In the dimmer circuit 4, the external control unit 44 may be a push button, an infrared sensor or a wireless receiver for wi-fi or Bluetooth® signals connected to a pin P21 of the microcontroller 42. When the external control unit 44 is activated, a binary signal is generated recognizable by the microcontroller 42. In addition, a DC source 46 derived from the AC power source 6 provides the working voltage $V_{DD}$, preferable $V_{DD}$=5 V, for the circuit system operation.

Figure 7:
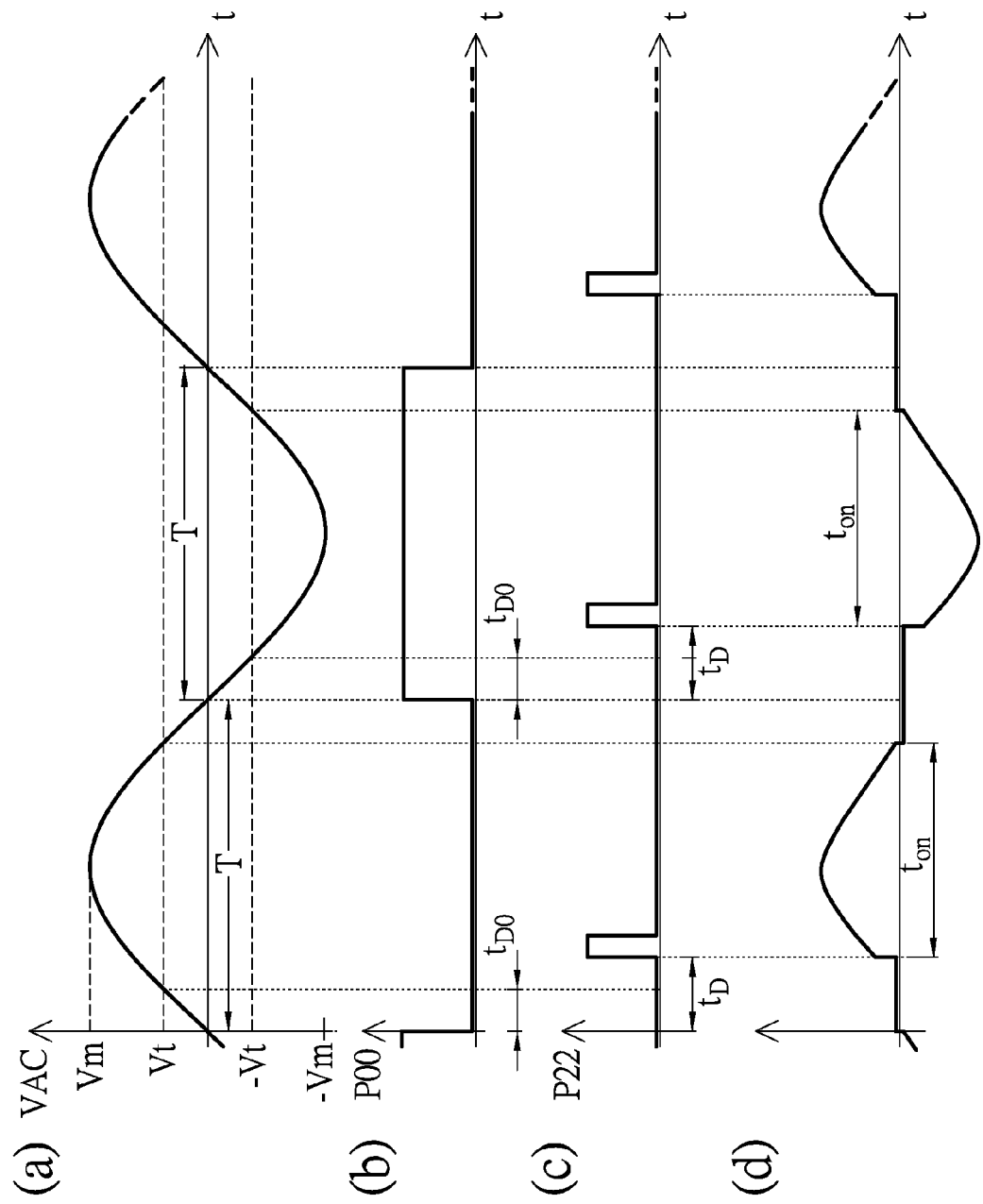
FIG. 7 schematically shows the signal waveforms related to the operation of the dimmer circuit depicted in FIG. 6 in accordance with the present disclosure.

Reference is made to FIG. 7 and in view of FIG. 6. FIG. 7 illustrates signal waveforms (a)-(d) relating to operation of the dimmer circuit 4. The waveform (a) is the sinusoidal AC voltage of the AC power source 6 having amplitude $V_m$ and half-cycle period T. The waveform (b) is square wave signal generated from the zero-crossing-point detector 43, in such a manner that the transistor $Q_1$ is switched between deep conduction and cutoff by the AC voltage. The waveform (b) delivers AC synchronous time reference to a pin P00 of the microcontroller 42. The waveform (c) is a pulse-form trigger signal generated by the microcontroller 42 with the time reference of the waveform (b). The trigger signal with time delay $t_D$ is delivered from a pin P22 of the microcontroller 42 to trigger the triac T1 (bidirectional control switch 41) to perform conductive phase angle control. The waveform (d) is the voltage signal across the two terminals of the lighting load 5 when the triac T1 is triggered by the trigger signal (c). The waveform (d) is characterized by a conductive period $t_{on}$ in each AC half-cycle, with $t_{on}=T-t_D-t_{D0}$, by taking account of the time point of triggering $t_D$ and the non-conductive phase zone (from $t=T-t_{D0}$ to $t=T$) caused by threshold voltage $V_t$ of the lighting load.

In accordance with an embodiment of the present disclosure, a lighting load detector is coupled to a lighting load for monitoring the electric state of the lighting load. In FIG. 6, the lighting load detector 45 comprises a current sensing resistor (R1) 45a connected in series with the lighting load 5 and a pickup circuit composed of a rectifier and an amplifier (A1). The pickup circuit has its amplifier output connecting to a pin P23 of the microcontroller 42. The lighting load detector 45 examines therefore with sensing resistor 45a the electric state of the lighting load 5, and delivers the sensing signal, or status signal, to the microcontroller 42 at the time when triac T1 is triggered. When the lighting load is turned on thereafter, electric current flows through the sensing resistor 45a. The pickup circuit generates thus a high voltage at its amplifier output terminal. The high voltage will be interpreted by the microcontroller 42 as bit 1. A status signal of bit 1 denotes the lighting load 5 in conduction. When the lighting load is cut-off, no electric current flows in the sensing resistor 45a. The pickup circuit generates thus a zero or ground voltage which will be interpreted as bit 0. A status signal of bit 0 denotes the lighting load 5 in cutoff state. The status signal generated by the lighting load detector 45 is therefore binary signal. By referring to the binary status signal, the microcontroller 42 executes program codes for searching the time phase ($t_{D0}$) of the threshold voltage of the lighting load, which will be explained later.

Figure 8:
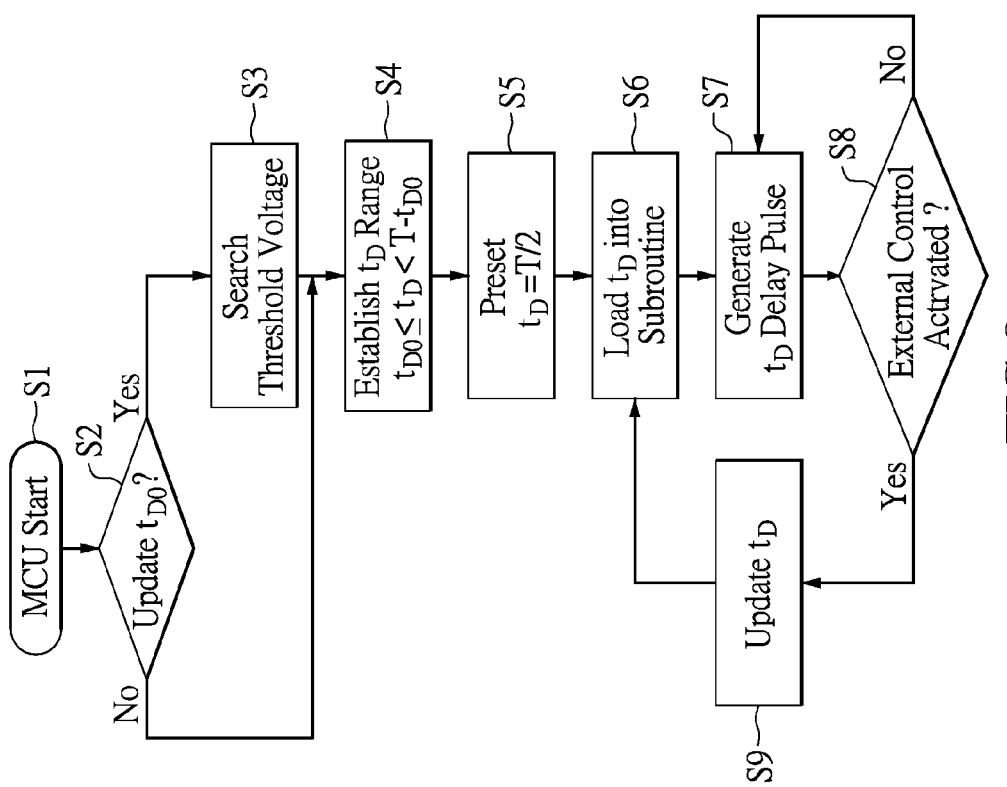
FIG. 8 schematically shows a flow chart depicting the general structure of program codes embedded in a microcontroller in accordance with an embodiment of the present disclosure.

FIG. 8 is a flow chart depicting the software program employed in the dimmer circuit 4 in accordance with an embodiment of the present disclosure. In FIG. 8, the flow chart depicts execution of program codes embedded in microcontroller 42 of the dimmer circuit 4; the program codes contain main program (S4-S9) for common dimming control and subroutine (S3) for implementing on line detection of the time phase of the threshold voltage of the lighting load 5. In the flow chart, each step is noted briefly for comprehension, such as, $t_{D0}$ is the time phase of threshold voltage, $t_D$ is the time delay of the trigger signal for conductive phase angle control, and T is the half-cycle period of AC voltage, by referring to the waveforms (a) and (c) of FIG. 7. The microcontroller 42 starts its program codes from "MCU Start" or reset (S1) when the dimmer circuit 4 is powered by the AC power source 6. The program codes proceed to "Update $t_{D0}$?" to decide whether an updating of the time phase $t_{D0}$ is required (S2). If a new lighting load 5 is attached to the dimmer circuit 4, the program codes run firstly the on line detection subroutine to determine the time phase $t_{D0}$ of threshold voltage (S3), and afterward perform with this detected time phase $t_{D0}$ the common light dimming control (S4-S9). Otherwise, the program codes retrieve a former $t_{D0}$ from microcontroller database, detour the subroutine (S3), and proceed to common dimming operation (S4-S9).

In FIG. 8, the program codes establish dimmer working range (S4) defined by $t_{D0}<t_D<T-t_{D0}$ based on information of the time phase $t_{D0}$ and the AC half-cycle period T. For common dimming operation, the program codes start from presetting time delay $t_D$, preferably $t_D=T/2$, for generating trigger signal (S5). The program codes load the preset $t_D$ into a data register reserved in a subroutine for generating trigger signal with time delay $t_D$ (S6). The program codes generate the trigger signal with time delay $t_D$ (S7) to trigger the bidirectional control switch 41 and to turn on the lighting load 5 for delivering lighting of intensity level in proportion to conductive phase angle controlled by the time delay $t_D$. Further, the program codes perform the lighting control continuously in a loop (S7-S8) to deliver illumination of a fixed light intensity level controlled by the same time delay $t_D$. If the external control unit 44 is activated (S8) by the user with intention to change light intensity level (S9), the program codes jump out of the loop (S7-S8) into a set-up loop (S6-S9) to change the time delay $t_D$ by activating the external control unit 44. The set-up loop (S6-S9) performs preferably a free-run mode, wherein the time delay $t_D$ of the trigger signal is varied with scan manner traversing through dimmer working range defined by $t_{D0} < t_D < T - t_{D0}$, such that the lighting load 5 emits light with gradually varying light intensity from high level to low level, or vice versa, when the external control unit 44 remains activated. The user can follow the light intensity variation to select a desired illumination by releasing the external control unit 44 (S8), such that the free-run mode is ended at the desired light intensity level, and a new time delay $t_D$ is set up therefore. Afterward, the program codes return to the loop (S7-S8) to deliver illumination with constant light intensity level controlled by the new time delay $t_D$. The lighting control operation can be ended when the dimmer 4 is disconnected from the AC power source 6, and the numerical values of $t_{D0}$ and $t_D$ of the latest operation are stored in the data memory, preferable a flash memory, of the microcontroller 42, for resuming the next cycle of lighting management.

The flow chart depicted in FIG. 8 describes a dimmer circuit operation controlled by software program. It is ready to see the advantage of the present disclosure, when the dimmer circuit works in a free-run mode. The dimmer circuit employing on line method to detect the time phase $t_{D0}$ of threshold voltage can renew automatically dimmer working range accommodating to a connected lighting load. When the dimmer circuit works in free-run mode to control the lighting load emitting light with intensity varying gradually from high level to low level, or vice versa, the time delay $t_D$ of the trigger signal is limited accurately in a working range $t_{D0} < t_D < T - t_{D0}$, such that troubles like light flickering or non-performance of dimmer circuit may be avoided.

The search subroutine (S3) in FIG. 8 illustrates software implementation of the on line method to detect the time phase $t_{D0}$ of threshold voltage. The on line method is based on a search algorithm in conjunction with a lighting load detector (hardware setup). As aforementioned, the search algorithm may utilize an incremental scheme or a lower bound-upper bound scheme to steer the time delay $t_D$ of the trigger signal approaching the time phase $t_{D0}$ of threshold voltage, wherein the steering is based on judgment of the status signal delivered from the lighting load detector. Detailed descriptions are given as follows.

Figure 9A:
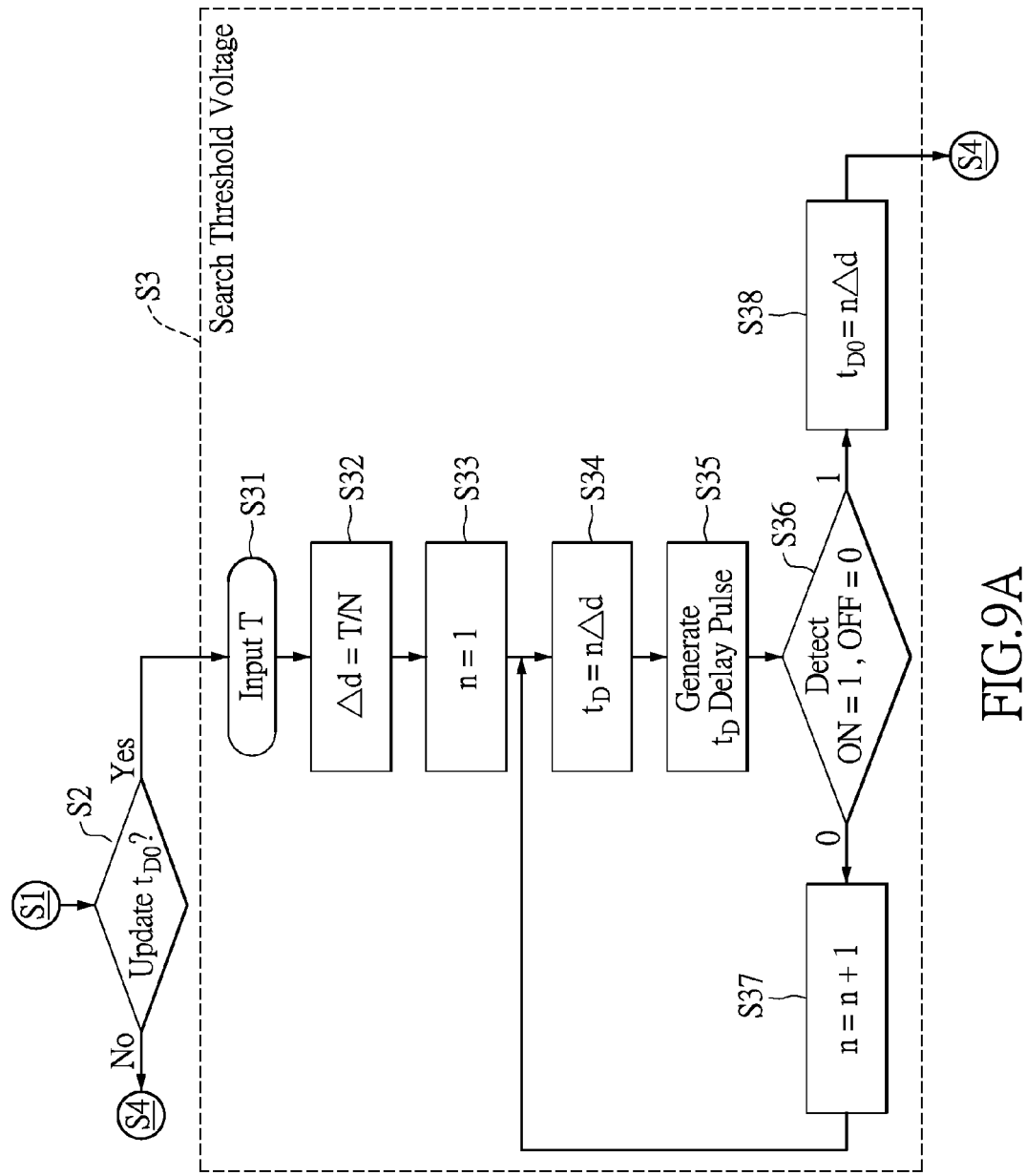
FIG. 9A schematically shows a flow chart describing the search algorithm based on incremental scheme for on line detecting the time phase of the threshold voltage of an AC lighting load in accordance with an embodiment of the present disclosure.

FIG. 9A is a flow chart depicting the subroutine (S3) for performing the search algorithm utilizing an incremental scheme. The subroutine (S3) follows the decision block "Update $t_{D0}$?" (S2). The search algorithm is an iteration process by repeatedly executing program codes for generating trigger signal with time delay $t_D$ in incremental manner, and examining at the time of triggering the electric state of the lighting load with the lighting load detector. The subroutine S3 begins with loading the AC half-cycle period T into a data register (S31). The microcontroller 42 acquires with program codes the AC half-cycle period T from AC synchronous square wave generated by the zero-crossing-point detector 43. The AC half-cycle period T serves as a time reference for dimmer operation. Then, a small time quantity $\Delta d$ is defined by $\Delta d = T/N$ (S32), preferably with $N=100$. The integer N may be either preset by the program designer or selectable by the user. A data register n is reserved for the iteration process. The search algorithm begins iterative searching by initializing the data register n with $n=1$ (S33). The initial condition $n=1$ implies that the time delay $t_D$ of the trigger signal varies incrementally from $t_D = \Delta d$; the time of triggering begins from a time location nearby the zero-crossing point of AC voltage. The iteration starts from step "$t_D = n\Delta d$" (S34) by loading a time delay $n\Delta d$ into a time delay register $t_D$ reserved for the quantity $t_D$. The microcontroller 42 generates with program codes trigger signal with time delay $t_D$ (S35). At the time of triggering, the microcontroller 42 processes with program codes the electric status signal generated from the lighting load detector 45. According to the status signal, a decision is made by the program codes to steer the incremental change of $t_D$ (S36). If the status signal is recognized as bit 0, it denotes that the lighting load is cut-off. The program codes generates a control bit OFF=0. With control bit OFF=0, the search algorithm updates the data register n incrementally with $n=n+1$ (S37) and resumes a next cycle of iteration (S34). If the status signal is recognized as bit 1, it denotes that the lighting load is in conduction. The program codes generates a control bit ON=1. With control bit ON=1, the search algorithm ends the iteration cycle and stores a final value of the time delay register as the time phase $t_{D0}$, such that $t_{D0} = n\Delta d$ (S38). The time phase $t_{D0}$ of threshold voltage of a lighting load is thus procured from this on line method. The time phase $t_{D0}$ and the AC half-cycle period T are then used to establish a dimmer working range accommodating to a lighting load connected with the dimmer circuit (S4). Thereafter, the program codes leave the searching subroutine (S3) and proceed with main program (S4-S9) for common lighting management.

Preferably, a circuit arrangement may be provided to disable the lighting load detector in the dimmer circuit after the program codes complete the on line detection of time phase $t_{D0}$. In FIG. 6, the lighting load detector 45 comprises a relay 45b to bypass the current sensing resistor (R1) 45a. The relay 45b is normally on, such that the sensing resistor 45a has its two terminals short-circuited. When the program codes execute the on line search algorithm, the microcontroller 42 generates a high voltage through its pin P24 to turn on a transistor connected in series with the relay 45b. The relay 45b is activated to be open-circuited for a time period wherein electric current may flow through the sensing resistor 45a. The lighting load detector 45 is thus enabled by activating the relay 45b when the program codes perform the on line search algorithm. By the end of the search algorithm, the microcontroller 42 resets its pin P24 to ground potential, therefor to turn off the transistor connected in series with the relay 45b. The relay 45b returns to normal state to conduct electric current from the lighting load 5. Then, the sensing resistor 45a is short-circuited by the relay 45b; the lighting load detector 45 is thus disabled. This bypass circuit may be considered as a design option for the sake of power saving to avoid extra power dissipation on the resistor 45a.

Figure 9B:
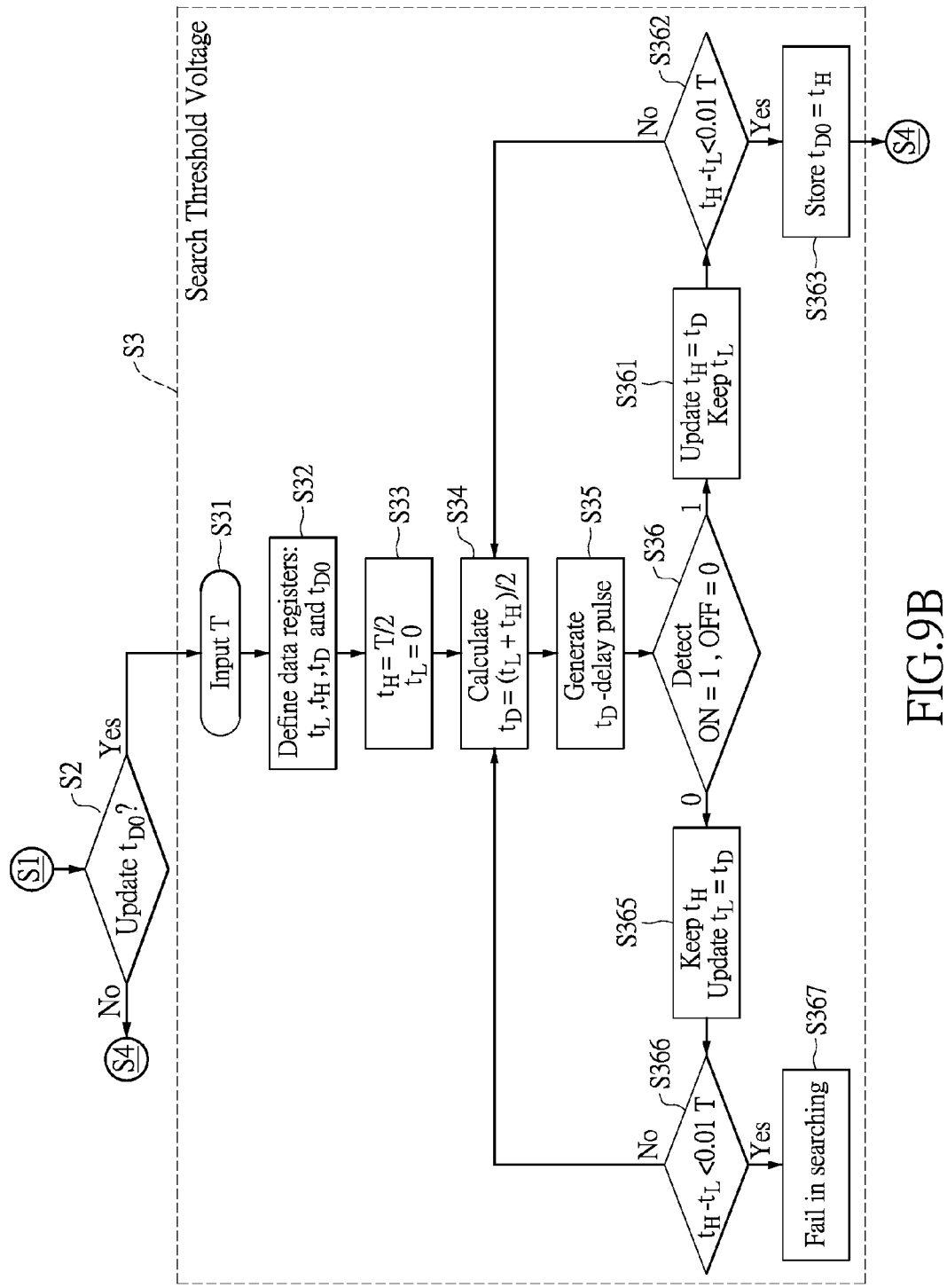
FIG. 9B schematically shows a flow chart describing the search algorithm based on upper bound/lower bound scheme for on line detecting the time phase of the threshold voltage of an AC lighting load in accordance with an embodiment of the present disclosure.

FIG. 9B is a flow chart depicting the subroutine (S3) for performing the search algorithm utilizing a lower bound-upper bound scheme. The subroutine (S3) follows the decision block "Update $t_{D0}$?" (S2). The search algorithm is an iteration process by repeatedly executing program codes for generating trigger signal with time delay $t_D$ calculated from a lower bound and an upper bound, and alternately examining at the time of triggering the electric state of lighting load with lighting load detector. In such a way that the search algorithm interacts with the lighting load detector, the time delay $t_D$ of the trigger signal is guided to move into the vicinity of the time phase $t_{D0}$ relating to the threshold voltage of the lighting load.

In FIG. 9B, the search subroutine (S3) begins with loading the AC half-cycle period T into a data register (S31). The meaning of the AC half-cycle period T has been explained before. The search subroutine defines data registers reserved for storing temporal values of $t_L$, $t_H$, $t_D$ and $t_{D0}$ (S32). The search algorithm begins iterative search by initializing the data registers with $t_L=0$ and $t_H=T/2$ for successive calculations (S33). The initial condition with $t_L=0$ and $t_H=T/2$ implies that the time phase $t_{D0}$ is encircled by the two bounds. The iterative cycle starts by computing $t_D=(t_L+t_H)/2$ (S34). The microcontroller generates with program codes the trigger pulse with the time delay $t_D$ calculated from lower bound $t_L$ and upper bound $t_H$ (S35). At the time of triggering, the microcontroller 42 processes with program codes the electric status signal generated from the lighting load detector 45. According to the status signal, a decision is made by the program codes (S36). If the status signal is recognized as bit 0, it denotes that the lighting load is cut-off. The program codes generate a control bit OFF=0. With control bit OFF=0, the search algorithm updates the data register $t_L$ with $t_L=t_D$ and keeps the data register $t_H$ unchanged (S365). After a convergence check with preset criterion (S366), the search algorithm resumes the next cycle of iteration (S34) by calculating a new $t_D$ from the updated/unchanged values of $t_L$ and $t_H$. If the status signal is recognized as bit 1, it denotes that the lighting load is in conduction. The program codes generate a control bit ON=1. With control bit ON=1, the search algorithm keeps the data register $t_L$ unchanged and updates the data register $t_H$ with $t_H=t_D$ (S361). After a convergence check with preset criterion (S362), the search algorithm resumes likewise the next cycle of iteration (S34). The iterative calculations are executed in two separated loops respectively controlled by two check criteria (S362, S366). In the case of control bit ON=1, the iteration may be ended when $0<t_H-t_L<0.01 \cdot T$ (S362), that implies a shrinkage of $t_H$ toward $t_L$ to compress $t_D$ into the value domain of $t_{D0}$. In another case of control bit OFF=0, the iteration may stop with $0<t_H-t_L<0.01 \cdot T$ (S366-S367); this case happens however rarely if the electric state of the lighting load is detected and correctly interpreted by the microcontroller. Therefore, the iteration is ended quickly with safety (S362). At the end of iteration, the final content of the data register $t_H$ is loaded into the data register $t_{D0}$ (S363), namely, $t_{D0}=t_H$, to complete the on line detection. The time phase $t_{D0}$ of threshold voltage of a lighting load is thus procured from this on line method. The time phase $t_{D0}$ and the AC half-cycle period T are then applied to establish a dimmer working range accommodating to a lighting load connected with the dimmer circuit (S4). Thereafter, the program codes leave the searching subroutine (S3) and proceed with main program (S4-S9) for common lighting management.

The software program illustrated with flow charts in FIG. 8, FIG. 9A and FIG. 9B can be easily understood by examining the dimmer circuit 4 illustrated in FIG. 6 and the accompanying signal waveforms illustrated in FIG. 7. In brief, the dimmer circuit 4 is the fundamental framework. This on line search method is simply realized by adding an extra hardware setup to the fundamental framework. In FIG. 6, the hardware setup is a lighting load detector coupled to the lighting load. The dimmer circuit performs the on line method by executing microcontroller program codes and processing status signal generated from the lighting load detector to carry out a search algorithm. A specialty of the present disclosure is that program codes of different search algorithms can be written in the microcontroller of the dimmer circuit to optimize search process without changing circuit structure.

Figure 10:
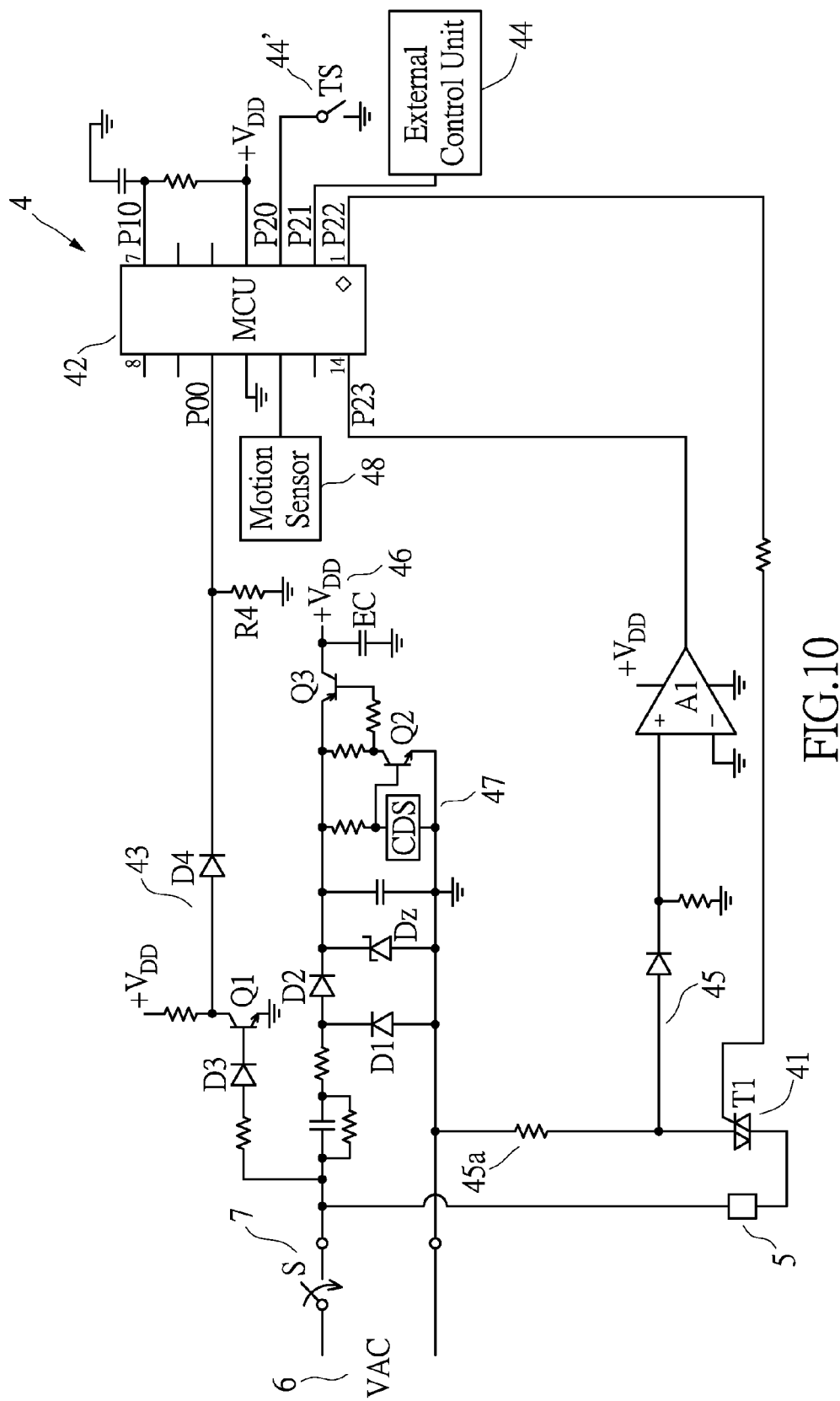
FIG. 10 schematically shows a circuit diagram of two-level security light with method for on line detecting the time phase of the threshold voltage of an AC lighting load in accordance with an embodiment of the present disclosure.

Further, reference is made to FIG. 10 in accordance with an embodiment of the present disclosure. FIG. 10 has similar circuit components like that of FIG. 6, except modifications by adding two sensor devices 47, 48 and a toggle switch 44', such that a lighting apparatus comprising the modified dimmer circuit becomes a two-level security light. The modifications do not change the basic circuit operation. The signal waveforms (a)-(d) in FIG. 7, that are used to explain operation of the circuit depicted in FIG. 6, can also be applied to the circuit depicted in FIG. 10.

In FIG. 10, a photo sensor CDS 47 and a motion sensor 48 are incorporated into the electric circuit 4 for advanced lighting management. Due to the difference of received light intensity, the photo sensor CDS has a low resistance at daytime and a high resistance at nighttime. It is readily to see from the circuit arrangement that the photo sensor CDS 47 turns on the transistor pair $Q_2$-$Q_3$ at dusk to enable the DC voltage $V_{DD}$ 46 supplied to the microcontroller circuit 42. A lighting apparatus built with the dimmer circuit 4 can thus be automatically turned on at dusk and turned off at dawn by the photo sensor CDS 47. During the whole night time, the microcontroller 42 runs program codes to control the lighting load 5 emitting an accent light with low level light intensity and upon intrusion detection by the motion sensor 48 to control the lighting load 5 emitting momentarily warning light with high level light intensity. Accordingly, the lighting apparatus can perform two-level illumination managed by the microcontroller 42.

Figure 11:
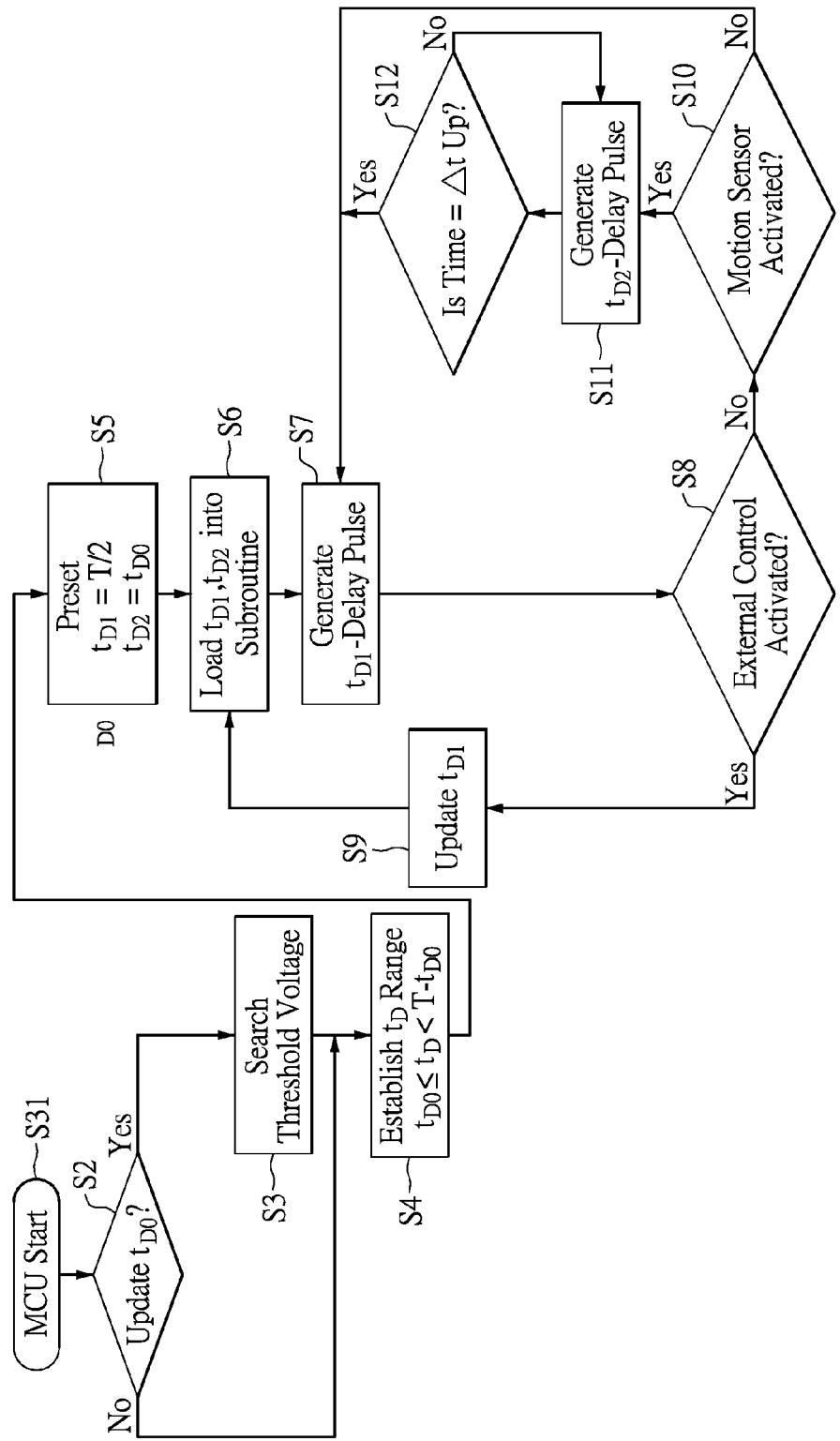
FIG. 11 schematically shows a flow chart depicting the structure of a software program written in a microcontroller to implement a two-level security light depicted in FIG. 10 with adjustable lighting intensity for low level illumination in accordance with an embodiment of the present disclosure.

Reference is made to FIG. 11 and in view of FIG. 10 for understanding software management of two-level illumination. FIG. 11 shows a flow chart depicting the program codes written in the microcontroller 42 for controlling illuminations incorporated with the motion sensor 48. The flow chart of FIG. 11 is a modification of the flow chart of FIG. 8 by adding three blocks (S10-S12) to take activation of motion sensor into account. In FIG. 11, the software program begins from "MCU Start" and "Update $t_{D0}$?" ((S1-S2), like in FIG. 8. It follows either applying the on line method to find out the time phase $t_{D0}$ of the threshold voltage of the lighting load 5 (S3) or directly retrieving a former $t_{D0}$, and then establishing dimmer working range: $t_{D0}<t_D<T-t_{D0}$ (S4). The program codes proceed to preset two parameters $t_{D1}$ and $t_{D2}$ for controlling illuminations with two different predetermined intensity levels (S5), and load $t_{D1}$ and $t_{D2}$ into two data registers reserved for a subroutine used to generate trigger signal for conductive phase angle control (S6). The program codes generate the trigger signal with time delay $t_{D1}$ to render the lighting load 5 emitting light of a first predetermined light intensity level (S7). Two controlling blocks are used respectively to monitor activation of the external control unit 44 (S8) and the motion sensor 48 (S10). Under circumstance that the two units 44, 48 (external control unit 44 and motion sensor 48) are not activated, the program codes get into a first subroutine, starting with "Generate $t_{D1}$-Delay Pulse" (S7), following with "External Control Activated?" (S8) and "Motion Sensor Activated?" (S10) and returning to "Generate $t_{D1}$-Delay Pulse" (S7), to generate trigger signal with time delay $t_{D1}$ to render the lighting load 5 emitting constantly light of the first predetermined light intensity level in proportion to the conductive time $T-t_{D1}-t_{D0}$ in each half-cycle of AC voltage. It is readily to see that the first subroutine can be represented by a first loop (S7-S8-S10). Upon intrusion detection by the motion sensor 48, the program codes by question "Motion Sensor Activated?" with "yes" (S10) jumps into a second subroutine, starting with "Generate $t_{D2}$-Delay Pulse" (S11), following with "Is Time Δt Up ?" (S12) and returning to "Generate $t_{D2}$-Delay Pulse" (S11) for generating trigger signal with time delay $t_{D2}$ to render the lighting load 5 emitting constantly light of a second predetermined light intensity level in proportion to the conductive time $T-t_{D2}-t_{D0}$ in each half-cycle of AC voltage. The second subroutine can be represented by a small second loop (S11-S12). The illumination with the second predetermined light intensity level continues only for a short time period Δt. After the time period Δt the program codes jump by question "Is Time Δt Up?" with "yes" out of the second subroutine and return to the first subroutine to generate trigger signal with time delay $t_{D1}$ to render the lighting load 5 emitting constantly again light of the first predetermined light intensity level. In brief, a lighting apparatus operated with the microcontroller program codes depicted in FIG. 10 can thus normally emit light with a first light intensity level and upon intrusion detection by motion sensor switch to emit momentarily light with a second light intensity level for a short time period Δt.

In accordance with the present disclosure, the flow chart of FIG. 11 describes the program codes to perform a two-level illumination controlled by two loops characterized by a first light intensity level relating to $t_{D1}$ and a second light intensity level relating to $t_{D2}$. The illumination of the first predetermined light intensity level can be further adjusted or changed through the external control unit 44 activated by the user. The illumination level is adjusted on a software basis by tuning the time delay $t_{D1}$. Referring to FIG. 11 and in view of FIG. 10, the program codes may jump out of the first subroutine by question "External Control Activated?" with "yes" into a third subroutine when the user begins to manually operate the external control unit 44. The third subroutine starts with "Update $t_{D1}$" to change time delay $t_{D1}$ (S9) in response to the user's operation, follows with "Load $t_{D1}$, $t_{D2}$ into Subroutine" by loading a new $t_{D1}$ into data register (S6) and subsequently with "Generate $t_{D1}$-Delay Pulse" in which trigger signal with a delay time of the modified $t_{D1}$ is generated (S7), and returns to "External Control Activated?" to check if the user still operates the external control unit 44 (S8). The third subroutine for adjusting the first light intensity level constitutes a third loop (S8-S9-S6-S7). By operating the external control unit 44, the third subroutine proceeds in repeated sequence in each half-cycle of AC voltage to gradually tune the parameter $t_{D1}$ traverse through the dimmer working range: $t_{D0}<t_{D1}<T-t_{D0}$, in response to the user's command. The light intensity of the lighting load 5 varies thereof continuously as long as the user puts his hand on the external control unit. The user can follow with his eyes such continuously varying illumination during the adjustment and select an appropriate light intensity level determined with his vision. The lighting load 5 emits light of a favorable first lighting intensity level when the user releases the external control unit 44 to end the adjustment. Thereafter, the program codes of the microcontroller 42 jump out of the third subroutine by question "External Control Activated?" with "no" and return to the first subroutine to control the lighting load 5 emitting constantly light with a preferred first light intensity level selected by the user.

In the two-level illumination based on the flow chart of FIG. 11, the first light intensity level is preferable to be a low intensity level and the second light intensity level is preferable to be a high intensity level. For an illumination of low intensity level, the time delay $t_{D1}$ is preferable in a range: $T/2<t_{D1}<T-t_{D0}$. Accordingly, a low level of 50% light intensity is controlled by trigger signal with time delay $t_{D1}\approx T/2$; a low level of zero light intensity is resulted from trigger signal with $t_{D1}\approx T-t_{D0}$. The microcontroller can generate trigger signal with delay time $t_{D1}$ precisely from its clock pulses based on a built-in oscillator. The low illumination level can thus be freely adjusted from zero to 50% light intensity in a simple scheme by operating external control unit to tune $t_{D1}$ in the range $T/2<t_{D1}<T-t_{D0}$ managed by the program codes. The adjustability of the low illumination level can be thus implemented with the dimmer circuit 4 and the microcontroller program codes described in FIG. 8 and FIG. 11, respectively, in accordance with the present disclosure with a simple hardware circuitry.

In the two-level lighting managed by the program codes depicted in FIG. 11, the second light intensity level is preferable to be a high intensity level controlled by trigger signal with $t_{D2}$ in a range: $t_{D0}<t_{D2}<T/2$. It is usually to select $t_{D2}\approx t_{D0}$, corresponding to a maximum conductive time period of $T-2\ t_{D0}$, to render the lighting load emitting warning light of full power level upon intrusion detection by the motion sensor. This high intensity level can also be adjusted by gradually tuning $t_{D2}$ in a range: $t_{D0}<t_{D2}<T/2$, wherein the parameter $t_{D2}$ is changed by a subroutine similar to the third subroutine (S9-S6-S7-S8) sketched in FIG. 11. In summary, the adjustment of illumination level can be performed on a microcontroller basis simply by generating trigger signal with time delay $t_D$ adjustable in a range of $T/2<t_D<T-t_{D0}$ and in a range of $t_{D0}<t_D<T/2$ respectively for adjusting a low and a high light level in accordance with the present disclosure.

Further, reference is made to FIG. 10. In FIG. 10, in addition to the external control unit 44, a toggle switch 44' is provided for discriminating between high level and low level in illumination level adjustment. The toggle switch 44' is connected to a pin P20 of the microcontroller 42. Two differentiable voltage potentials may appear at the pin P20 respectively by moving the toggle switch 44' up and down. The microcontroller 42 scans with program codes the pin P20 and may detect a ground potential, for instance, when the toggle switch 44' is switched down; under such circumstance, the program codes generate trigger signal with time delay $t_D$ adjustable in a range of $T/2<t_D<T-t_{D0}$ for adjusting the low level illumination by operating the external control unit 44. Conversely, the toggle switch 44' is switched up; the program codes generate trigger signal with time delay $t_D$ adjustable in a range of $t_{D0}<t_D<T/2$ for adjusting the high level illumination.

Revisiting FIG. 10, the external control units 44 connected with the microcontroller 42 can be a touch panel, an infrared sensor or wireless receiver receiving control signals compatible with wi-fi or Bluetooth®. In adjusting light level, the external control unit 44 is used as a communication tool between the microcontroller 42 and the user. The external control unit 44 generates generally binary signal having a high $V_{DD}$ and zero voltage when activated by the user. The binary signal can be encoded to become message carrying signal. For instance, the binary signal may have a zero voltage with duration longer than a predetermined time length to represent a specific instruction. This instruction is given by the user if the user activates the external control unit for duration longer than the predetermined time length. The signal format characterized by a zero voltage with the duration longer than the predetermined time length can be designed to represent the user's instruction for adjusting light level or selecting microcontroller working mode.

For daily life application it is commonly anticipated to make lighting apparatus a user-friendly installation such that different working modes in adjusting light level can be provided to the user. In this aspect, the microcontroller 42 can interpret the binary signal outputted from the external control unit 44 operated by the user and performs with program codes to select working mode for adjusting the illumination level of lighting apparatus. Further, in accordance with the present disclosure, two working modes can be performed by subroutines in response to the binary signals outputted from the external control unit, which are: (1) Manual adjustment mode for freely selecting low light intensity level in a range of 0% to 50% light intensity; (2) Two-minute free-run mode allowing selection of low light intensity level from a range of 0% to 50% light intensity when the two-level security light circuit is turned on and the microcontroller fails to identify a preset datum of low level light intensity. If no selection input is received in the first two minutes of the free-run mode, the microcontroller performs with program codes automatically a fixed low level lighting with 10% light intensity, and upon intrusion detection with motion sensor performs momentarily a high level lighting with 100% light intensity. The two-minute free-run mode is designed in accommodating to the warming-up time of the motion sensor, normally two minutes, when the lighting apparatus is turned on by the photo sensor.

Figure 12:
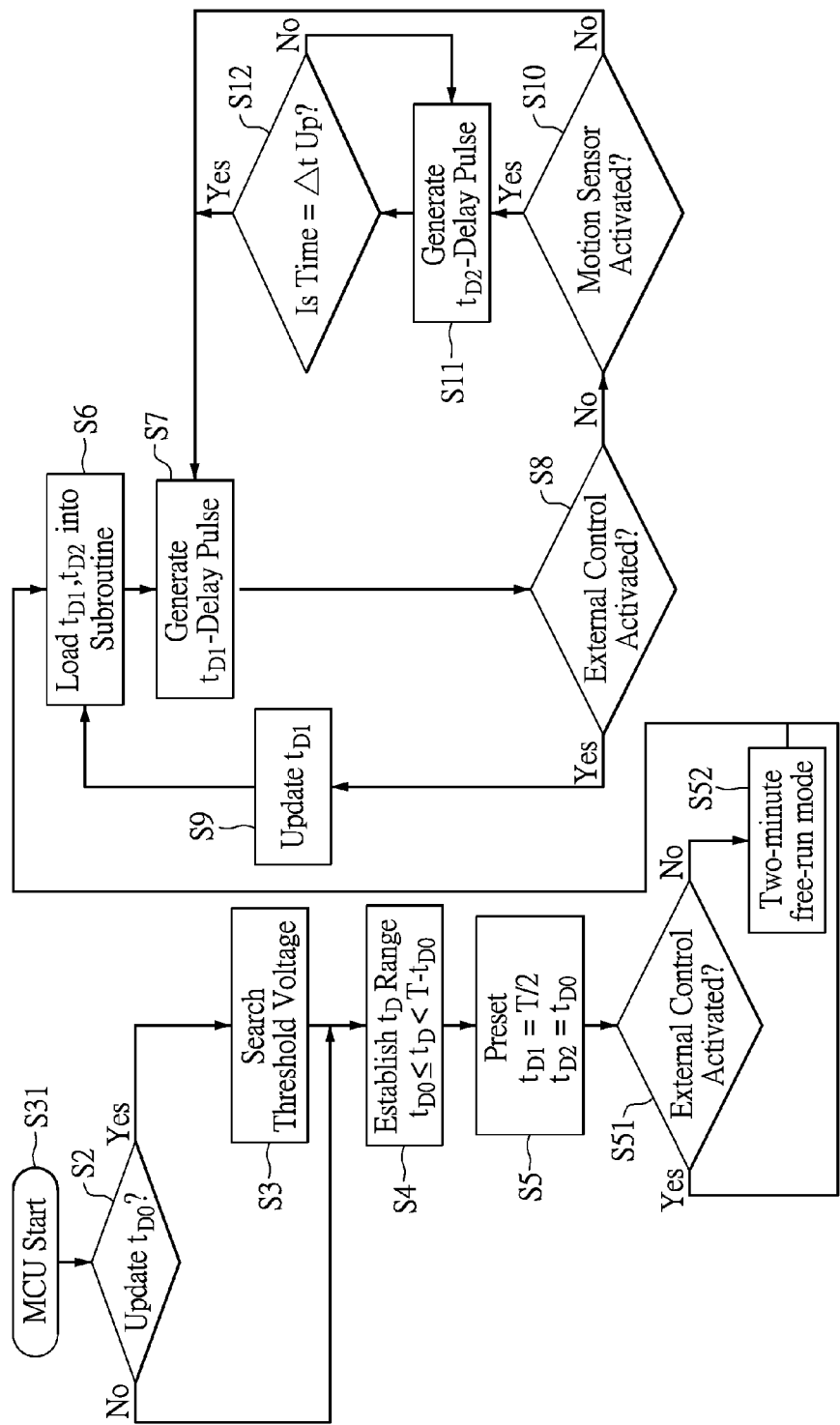
FIG. 12 schematically shows a flow chart depicting the structure of a software program written in a microcontroller to implement a two-level security light depicted in FIG. 10 with free-run mode to adjust and select lighting intensity for low level illumination in accordance with an embodiment of the present disclosure.

In accordance with an embodiment of the present disclosure, FIG. 12 is a modification of FIG. 11 by inserting two function blocks S51, S52 into the flow chart to illustrate an example with subroutine to perform two-minute free-run mode. In FIG. 12, an option is provided to bypass the two-minute free-run mode if the external control unit 44 is operated by the user (S51). Otherwise, the program codes execute the two-minute free-run mode (S52) automatically when the dimmer circuit 4 is powered. When the program codes execute the subroutine of two-minute free-run mode, the lighting load emits a low-level light with illumination varying gradually from 0% to 50%, and then reversely from 50% to 0% of full-power light intensity, to complete a variation cycle. The user can follow the light variation and select within a few variation cycles a low level illumination by activating the external control unit 44; the information of the selected low level lighting is then loaded into data registers (S6). If no selection is made in the first two minutes of the free-run mode, the program codes execute a default setting (S6) for performing a low level illumination with a pre-programmed light intensity. The low level lighting can be further changed by initiating a third subroutine (S8-S9-S6-S7). The present disclosure offers flexibility in dimmer design by modifying and optimizing program codes.

Revisit FIG. 10 for an optional design in the two-level security light circuit including a power switch S and an energy storage capacitor EC. In addition to the external control unit 44, it is possible by operating the power switch S to generate message carrying binary signal having a high voltage and a zero voltage for the reason as follows. The external control unit 44 may be powered, not illustrated in FIG. 10, by a circuitry connected to the AC power source 6. If the power switch S, for instance, a wall switch 7, is momentarily turned off and turned back on by a user, the external control unit 44 may momentarily lose electric power due to AC power interruption caused by the off-on operation of the wall switch such that a zero voltage with duration equal to the AC power interruption time period appears at a pin P21 of the microcontroller 42 which is connected with the external control unit 44. To utilize this property, the energy storage capacitor EC is provided to hold the working voltage VDD (46) for maintaining the microcontroller 42 still in operation when the AC power is interrupted. The user can therefore send an instruction to the microcontroller 42 by either activating the external control unit 44 or by off-on operation of the wall switch 7. Accordingly, a binary signal having a zero voltage with duration longer than a predetermined time period is generated and appears at the pin P21 recognizable by the microcontroller 42 for adjusting light level or selecting microcontroller working mode. The use of wall switch is convenient in managing the two-level security light when the lighting apparatus is installed at a position not easily accessible; the user can simply operate the wall switch by turning off momentarily and turning back on, namely, by off-on switch operation, in order to adjust light level or to select proper working mode without resorting to the external control unit.

Please refer to FIG. 10 for a variation in the construction of the two-level security light circuit wherein the photo sensor CDS 47 is removed. The original construction is then converted to a two-level light circuit having a motion sensor 48 retained. While the two-level security light circuit equipped with photo sensor is designed for outdoor lighting control, the two-level light with motion sensor to monitor room space occupancy by people is suitable for indoor lighting management. The two-level light circuit 4 equipped with a motion sensor 48, preferably an occupancy detector, as well as with on line capability to detect the time phase of threshold voltage of the lighting load 5, is turned on by connecting to the AC power source and turned off by detaching from the AC power source. When the two-level light circuit is turned on, the microcontroller 42 generates with program codes a first trigger signal with a first time delay $t_{D1}$ to trigger the bidirectional control switch 41 to control the lighting load 5 emitting an accent light with a low level light intensity and upon occupancy detection by the motion sensor 48 the microcontroller 42 generates with program codes a second trigger signal with a second time delay $t_{D2}$ to trigger the bidirectional control switch 41 to control the lighting load 5 emitting a light with a high level light intensity for providing full-power illumination to a room space. The first time delay $t_{D1}$ and second time delay $t_{D2}$ are set within a range from $t_{D0}$ to $T-t_{D0}$ established initially based on the time phase $t_{D0}$ information acquired from the lighting load 5 when the two-level light circuit 4 is powered on. Further, upon occupancy detection, the high level lighting may continue for a predetermined time period or may persist until the occupancy status being changed in such a manner that the high level light may be switched back to a low level light when the predetermined time period elapses or the room space becomes empty. The two-level light circuit of this art controls lighting based on people occupancy and thereof saves electric energy in a smart way. Preferably, the low level light intensity of the accent light is adjustable by the user to fulfill the user's need.

Figures 13A, 13B:
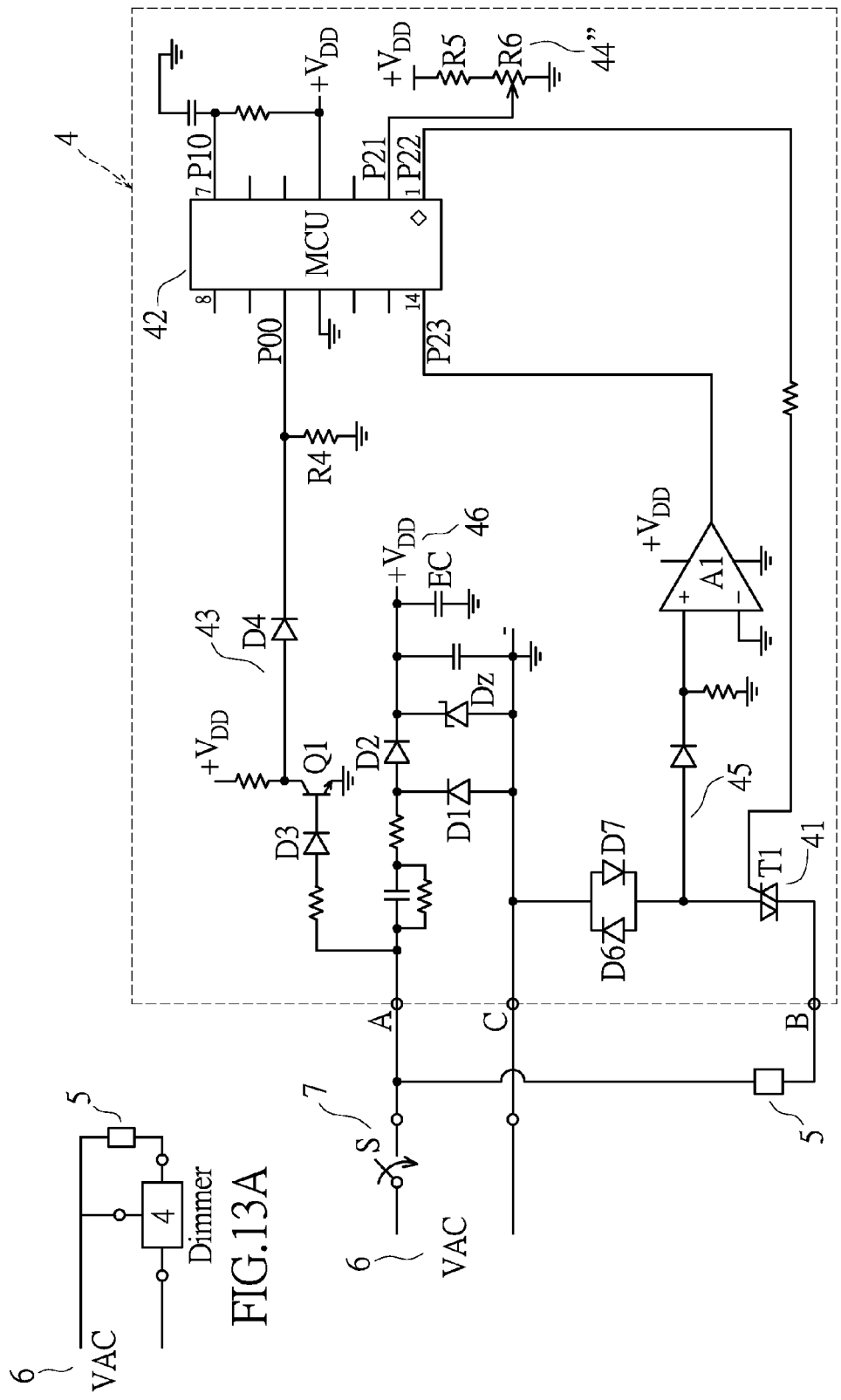
FIG. 13A and FIG. 13B schematically shows a dimmer circuit diagram with on line method for detecting the time phase of the threshold voltage of an AC lighting load and with a potentiometer to dim light in accordance with an embodiment of the present disclosure.

In accordance with an embodiment of the present disclosure, FIG. 13A and FIG. 13B illustrate microcontroller-based dimmer circuits equipped with on line detection capability to determine the time phase of the threshold voltage of a lighting load. In FIG. 13B, the dimmer circuit 4 is a three-wire dimmer with terminals A, B, and C connecting to the lighting load 5 and AC power source 6. FIG. 13B is a modification of the basic dimmer circuit illustrated in FIG. 6 by redesigning external control unit 44 and lighting load detector 45. Instead of a sensing resistor 45a, a diode pair D6-D7 is used as current sensing device integrated with the lighting load detector 45. The diode pair has a maximum terminal voltage less than 0.7 V when conducting current. The diode pair dissipates therefore a negligible power. Further, the external control unit 44 is constructed by a potentiometer 44". The program codes written in microcontroller have to be modified accordingly, not shown here, for accommodating with unique potentiometer operation, which is different from that of touch panel or infrared sensor. The construction with a potentiometer can facilitate the dimmer operation. The user can operate the dimmer 4 in a similar way like with conventional dimmer by rotating or sliding a potentiometer 44" to dim a lighting load through a full dimmer working range defined by $t_{D0}<t_D<T-t_{D0}$.

Revisit FIG. 13A and FIG. 13B for a preferable embodiment of the present invention. In FIG. 13A, the power switch S may be eliminated by integrating the on-off switch function into the three-wire dimmer 4. The three-wire dimmer 4 becomes an electronic switch to perform in addition to dimming function an extra on-off switch function. This function merging is implemented by modifying the program codes of the microcontroller 42 as shown in FIG. 13B. Accordingly, the external control unit 44" may be a two-stage potentiometer wherein the first stage is a fixed position of the potentiometer used to generate a zero voltage recognized by the microcontroller as the first type message carrying signal and the second stage is a continuously tuning segment of the potentiometer used to generate non-zero voltage recognized by the microcontroller as the second type message carrying signal. The first type message carrying signal represents an instruction for the microcontroller 42 to perform off-switch function. In response to the first type message carrying signal, the microcontroller 42 generates with program codes at a pin P22 a zero voltage to turn off the triac device T1 (bidirectional control switch 41), and hence also the lighting load 5. The second type message carrying signal represents an instruction for the microcontroller 42 to perform on-switch function. In response to the second type message carrying signal, the microcontroller 42 generates with program codes at the pin P22 the trigger signal with time delay $t_D$ in each AC half-cycle to turn on the triac device T1, and hence also the lighting load 5. When the lighting load 5 is turned on, the external control unit 44" may be further activated by the user to continuously generate non-zero voltage; the microcontroller 42 generates responsively the trigger signal with time delay $t_D$ in each AC half-cycle in a range of $t_{D0}<t_D<T-t_{D0}$ to perform dimming function. With merging the on-off switch function, the three-wire dimmer 4 is thus an universal dimmer attached directly to the AC power source operable on different types and brands of lighting loads backed up by the on line detection capability to determine the time phase of the threshold voltage of the lighting load.

Figure 14A:
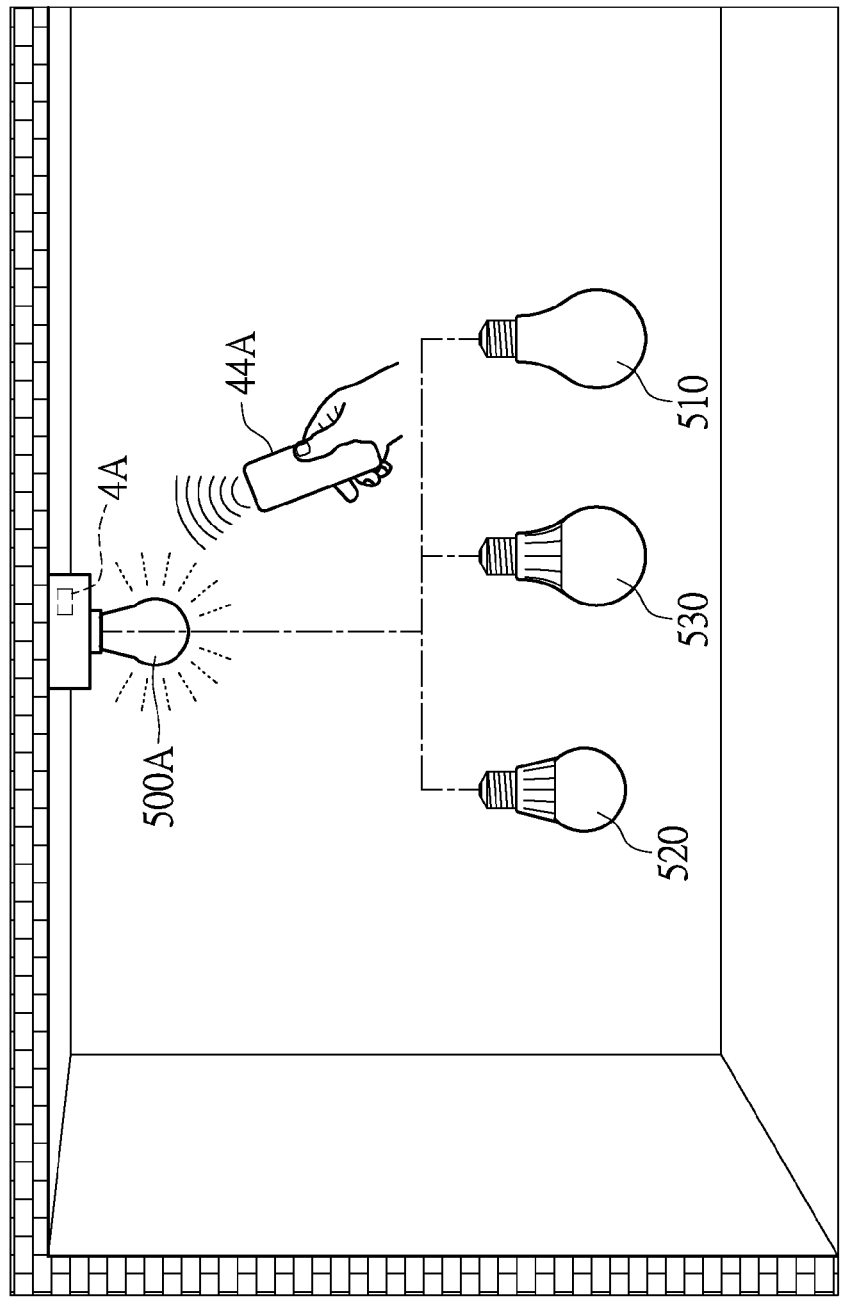
Figure 14B:
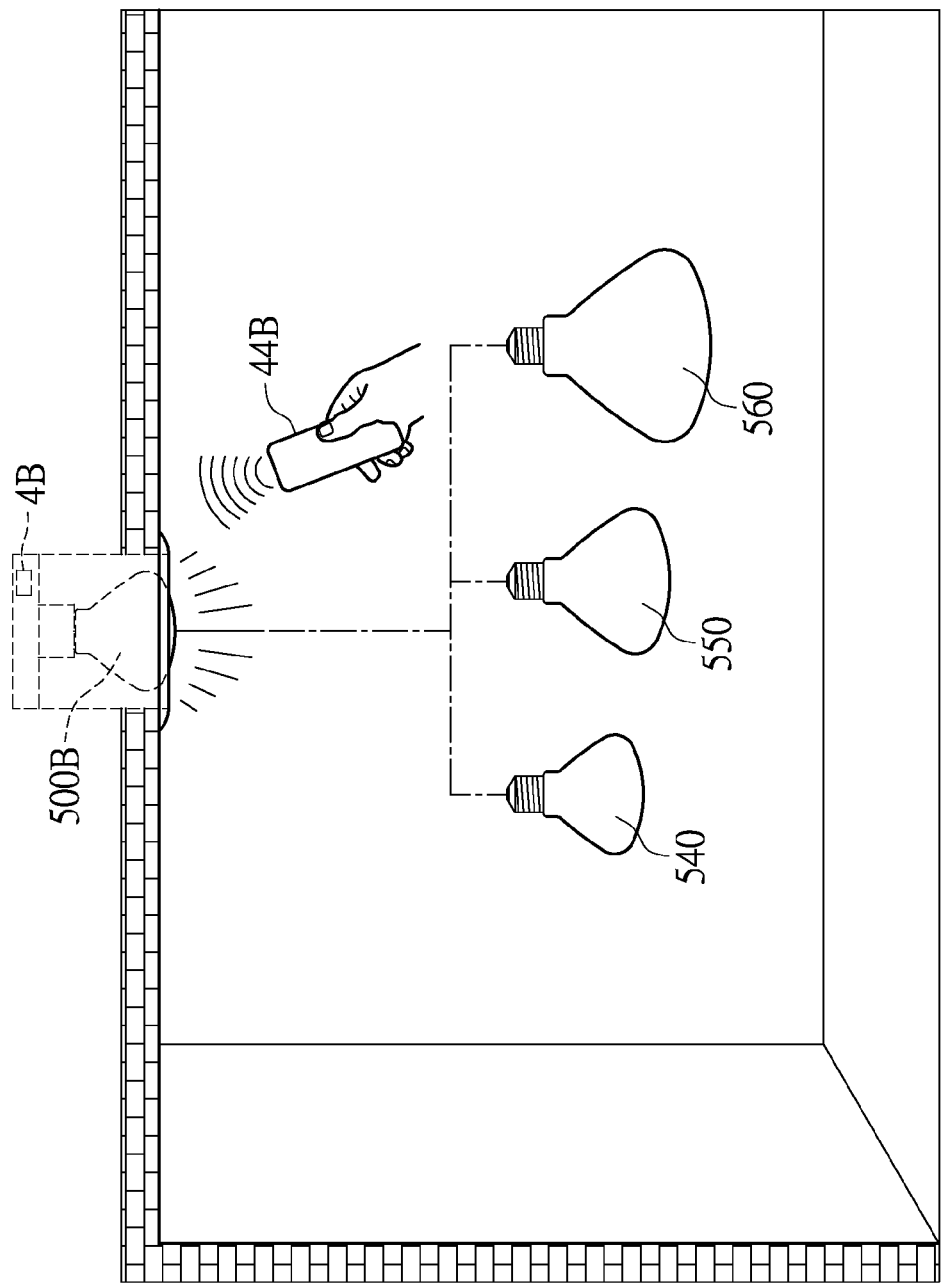

Further, based on the universal dimmer circuit illustrated in FIG. 13A and FIG. 13B, reference is made to FIG. 14A, FIG. 14B and FIG. 14C for three preferable embodiments of the present invention. In FIG. 14A of the first embodiment, an universal dimmer of the present invention is installed inside a ceiling light fixture such that the ceiling light fixture becomes a dimmable lighting apparatus adaptable to different types of screw-in lighting bulbs 500A connected with the universal dimmer 4A. The lighting bulbs 500A may be an incandescent bulb (510), a LED bulb (520) with lower wattage or a LED bulb (530) with higher wattage capacity. For the ceiling light fixture, the universal dimmer 4A has an external control unit 44 (not shown in FIG. 14A, referred to FIG. 6) preferably equipped with wireless/infrared receiver to receive wi-fi, Bluetooth® or infrared signals for light dimming control. In this way, even the threshold voltages are different among different types of lighting loads or among different wattages of LEDs, the light fixture is always able to produce smooth dimming work through operating a remote control unit 44A by the user. FIG. 14B is the second embodiment with the universal dimmer of the present invention installed in a recessed light fixture, wherein the universal dimmer 4B is connected with a screw-in lighting bulb 500B of different types of retrofit or different wattages of LED (for example, a LED bulb 540 with lower wattage, a LED bulb 550 with higher wattage or a halogen bulb 560 shown in FIG. 14B) retrofit to perform smooth dimming work through operating a remote control unit 44B by the user. FIG. 14C is the third embodiment with the universal dimmer circuit 4 of the present invention and the wall switch 7 integrated together to become a smart wall switch 4C. The smart wall switch 4C connected with a screw-in lighting bulb 500C (which can be a LED bulb 540 with lower wattage, a LED bulb 550 with higher wattage or a halogen bulb 560 shown in FIG. 14B) is able to manage on/off switch control and smooth dimming control for AC power based lighting load 500C characterized by a threshold voltage.

The foregoing descriptions relate to an universal dimmer circuit constructed with a microcontroller and incorporated with software technique, such that the dimmer circuit can on line detect the time phase of the threshold voltage of a lighting load connected with the dimmer circuit. This on line method uses a search algorithm performed by program codes of the microcontroller in conjunction with a hardware setup to monitor the electric state of the lighting load. The dimmer circuit utilizes this on line method to automatically renew the database of the time phase of threshold voltage, from which dimmer working range is established. The dimmer circuit can be operated compatibly with any lighting load, for instance, an incandescent lamp, a screw-in compact fluorescent lamp, an ACLED module, or a screw-in dimmable LED lamp, connected with the dimmer. The present disclosure provides also foundation for designing a two-level security light with its low intensity level adjustable in a range determined by the time phase of the threshold voltage of a lighting load. As a result, the low light intensity level can be adjusted trouble-free in a range of 10%~50% of full-power light intensity by the user to create a comfortable low level illumination. Alternately an adjustable range measured by lumens may be more useful to the user. For instance, the adjustable low level could be designed in a meaningful range of 0~700 lumens rather than applying a fixed percentage to the maximum capacity to avoid the low level embarrassingly reaching an impractical level which is too bright for performing esthetic night view and security alert function. The present disclosure with its capacity to on line establish a reliable dimmable range can precisely operate a soft turn on and soft turn off lighting management which may be required for designing user friendly lighting device. Accordingly, a humanized dimmer solution without resorting to complex circuit hardware is therefore feasible by using microcontroller technique, with which a universal dimmer can be constructed for accommodating to different types and brands of the lighting loads.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An on line method for detecting a time phase of a threshold voltage of a lighting load connecting to an AC voltage comprising:
   a search algorithm, using iteration calculations to gradually approach and identify the time phase of the threshold voltage of the lighting load in each half-cycle of an AC power source;
   a hardware setup coupling to the lighting load, generating a status signal to indicate a conduction or a cutoff electric state of the lighting load; and
   a microcontroller with program codes, controlling a conductive phase angle of the lighting load and executing program codes to perform the search algorithm in response to the status signal generated by the hardware setup;
   wherein the microcontroller successively generates a trigger signal with a time delay counted from the zero-crossing point of the AC voltage in each AC half-cycle; wherein, at the time of generating the trigger signal, the hardware setup generates the status signal to the microcontroller to indicate the electric conduction or the cutoff state of the lighting load; wherein the microcontroller processes the status signal delivered from the hardware setup and executes program codes to perform the search algorithm accordingly, wherein the microcontroller generates the trigger signal with a time delay, such that the time delay of the trigger signal is adjusted by the search algorithm performed following the status signal in an iterative manner to approach the time location or the time phase of the threshold voltage of the lighting load along the time axis in each AC half-cycle;
   wherein the search algorithm is an iteration process based on one of two schemes which are respectively an incremental scheme and a lower bound—upper bound domain shrinking scheme, wherein for the incremental scheme the iteration process ends at a point when the status signal is changed from the cutoff state to the conduction state, wherein for the lower bound-upper bound domain shrinking scheme the iteration process ends at a point when the domain formed by the lower bound and upper bound shrinks to a value equal to or less than a preset minimum value.

2. The on line method of claim 1, wherein the incremental scheme of the search algorithm is an iteration process to generate the trigger signal with the time delay beginning with a predetermined quantity of time phase increment and then increasing stepwise in each AC half-cycle; wherein in an iteration cycle when the trigger signal with the time delay is generated, if the status signal indicates a cutoff state of the lighting load, the search algorithm updates the time delay of the trigger signal by adding the predetermined quantity of time phase increment to the time delay and then continues the next cycle of iteration process to generate another one of the trigger signal with the updated time delay; wherein in the iteration cycle when the trigger signal is generated, if the status signal indicates a conduction state of the lighting load, the search algorithm ends the iteration process and concludes that the latest time delay represents the time phase of the threshold voltage of the lighting load.

3. The on line method of claim 2, wherein the time delay of trigger signal has a value beginning with the predetermined quantity (T/N) of time phase increment, where T is the AC half-cycle time period and N is an integer, and then increasing stepwise in each AC half-cycle according to the status signal, such that the time delay is expressed by n (T/N), where n is the sequence number of iteration, n=1, 2, 3, . . . and so on.

4. The on line method of claim 1, wherein the lower bound—upper bound domain shrinking scheme of the search algorithm is an iteration process to generate the trigger signal with the time delay calculated to be between a lower bound and an upper bound, wherein in an iteration cycle the trigger signal with a time delay is generated, if the status signal indicates a cutoff state of the lighting load, the search algorithm updates the lower bound with the time delay of the trigger signal and keeps the upper bound unchanged, and resumes the next cycle of iteration to generate the trigger signal with the time delay calculated to be between the updated lower bound and the unchanged upper bound; wherein in an iteration cycle when the trigger signal is generated, if the status signal indicates a conduction state of the lighting load, the search algorithm keeps the lower bound unchanged and updates the upper bound with the time delay of the trigger signal, and resumes the next cycle of iteration to generate the next trigger signal with the time delay calculated to be between the unchanged lower bound and the updated upper bound; wherein the search algorithm ends the iteration process by a convergent checking with the domain formed by the upper bound and lower bound shrunk to a value equal to or less than a preset minimum range and concludes that the latest upper bound is the latest time delay representing the time phase of the threshold voltage of the lighting load.

5. The on line method of claim 4, wherein in the first iteration cycle the lower bound is assumed zero and the upper bound is assumed T/2, where T is the AC half-cycle time period.

6. The on line method of claim 4, wherein in each iteration cycle the time delay of the trigger signal is calculated by averaging the lower bound and the upper bound.

7. A dimmer circuit connected in series with a lighting load and an AC power source, having on line capability to detect a time phase of a threshold voltage of the lighting load in each half-cycle of the AC power source, comprising:
   a bidirectional control switch connected in series with the lighting load;
   a zero-crossing-point detector for generating AC-synchronous signal from the AC power source;
   a microcontroller electrically coupled with the zero-crossing-point detector to perform conductive phase angle control by generating with program codes a trigger signal having a time delay $t_D$ counted from the zero-crossing point of AC voltage of the AC power source in each AC half-cycle to trigger the bidirectional control switch;
   an external control unit electrically coupled to the microcontroller; and
   a lighting load detector connected with the microcontroller and coupled to the lighting load for generating a status signal to indicate conduction/cutoff electric state of the lighting load;
   wherein when the dimmer circuit is powered by the AC power source, the microcontroller acquires with program codes the AC half-cycle time period T from the zero-crossing-point detector and performs with program codes a search algorithm to on line detect the time phase $t_{D0}$ of the threshold voltage of the lighting load connected with the dimmer circuit, wherein the microcontroller generates with program codes the trigger signal having the time delay, wherein the time delay of the trigger signal is adjusted by the search algorithm performed following the status signal delivered from lighting load detector, in an iterative manner, to approach the time phase $t_{D0}$ along the time axis in each AC half-cycle; wherein the AC half-cycle time period T and detected time phase $t_{D0}$ of threshold voltage are used to establish a dimmer working range defined by the trigger signal having time delay $t_D$ between $t_{D0}$ and $T-t_{D0}$; wherein the dimmer circuit performs light dimming with the established dimmer working range, wherein the light dimming is controlled by the external control unit operated by a user;

wherein the search algorithm is an iteration process based on one of two schemes which are respectively an incremental scheme and a lower bound—upper bound domain shrinking scheme, wherein for the incremental scheme the iteration process ends at a point when the status signal is changed from the cutoff state to the conduction state, wherein for the lower bound-upper bound domain shrinking scheme the iteration process ends at a point when the domain formed by the lower bound and upper bound shrinks to a value equal to or less than a preset minimum value.

8. The dimmer circuit of claim 7, wherein the user operates the dimmer circuit by activating the external control unit, the microcontroller performs with program codes light dimming in a free-run mode such that the time delay $t_D$ of the trigger signal is varied traversing through dimmer working range defined by $t_{D0}<t_D<T-t_{D0}$, the lighting load emits light with gradually varying light intensity from a high level to a low level, or vice versa; wherein a light intensity is selected by operating the external control unit to stop the free-run mode at a desired light intensity level.

9. The dimmer circuit of claim 7, wherein the external control unit is a touch panel, an infrared sensor, a wi-fi signal receiver, a Bluetooth® signal receiver or a push button generating binary signal having a zero and a high level voltage delivered to the microcontroller.

10. The dimmer circuit of claim 7, wherein the lighting load detector is a current sensing circuit comprising a resistor connected in series with the lighting load, the bidirectional control switch, and the AC power source.

11. The dimmer circuit of claim 7, wherein the lighting load is an ACLED module, a dimmable LED lamp, a screw-in compact fluorescent lamp, or an incandescent lamp.

12. The dimmer circuit of claim 7, wherein the bidirectional control switch is a triac device.

13. The dimmer circuit of claim 7, wherein the external control unit is a potentiometer provided with a rotating knob or a linear slider.

14. A two-level security light circuit connected in series with a lighting load and an AC power source having on line capability to detect a time phase of a threshold voltage of the lighting load, comprising:
 a dimmer circuit, comprising:
  a bidirectional control switch connected in series with the lighting load;
  a zero-crossing-point detector for generating AC-synchronous signal from the AC power source;
  a microcontroller electrically coupled with the zero-crossing-point detector to perform conductive phase angle control by generating with program codes a trigger signal with a time delay $t_D$ counted from the zero-crossing point of AC voltage of the AC power source in each AC half-cycle to trigger the bidirectional control switch;
  an external control unit electrically coupled to the microcontroller; and
  a lighting load detector connected with the microcontroller and coupled to the lighting load for generating a status signal to indicate conduction/cutoff electric state of the lighting load; and
 a motion sensor, electrically coupled with the dimmer circuit, detecting intrusion;
 wherein the microcontroller with program codes on line automatically acquires the AC half-cycle time period T and the time phase $t_{D0}$ of the threshold voltage of the lighting load by performing with program codes a search algorithm in conjunction with the lighting load detector;
 wherein the information of the AC half-cycle time period T and the time phase $t_{D0}$ of the threshold voltage of the lighting load are used to establish a dimmer working range for conductive phase angle control;
 wherein the microcontroller generates with program codes a first trigger signal with a first time delay $t_{D1}$ to trigger the bidirectional control switch to control the lighting load emitting an accent light with a first level light intensity and upon intrusion detection by the motion sensor the microcontroller generates with program codes a second trigger signal with a second time delay $t_{D2}$ to trigger the bidirectional control switch to control the lighting load emitting a warning light with a second level light intensity, wherein the first time delay $t_m$ and second time delay $t_{D2}$ are within a range from $t_{D0}$ to $T-t_{D0}$ established initially when the two-level security light circuit is powered by the AC power source;
 wherein the search algorithm is an iteration process based on one of two schemes which are respectively an incremental scheme and a lower bound—upper bound domain shrinking scheme; wherein for the incremental scheme the iteration process ends at a point when the status signal is changed from the cutoff state to the conduction state; wherein for the lower bound-upper bound domain shrinking scheme the iteration process ends at a point when the domain formed by the lower bound and upper bound shrinks to a value equal to or less than a preset minimum value.

15. The two-level security light circuit of claim 14, further comprising:
 a photo sensor, electrically coupled with the dimmer circuit, enabling the dimmer circuit operation at dusk and disabling the dimmer circuit operation at dawn, wherein the two-level security light circuit is turned on at dusk and through the whole night time, and turned off at dawn by the photo sensor.

16. The two-level security light circuit of claim 14, wherein the first level light intensity is a low level intensity and the second level light intensity is a high level intensity.

17. The two-level security light circuit of claim 14, wherein the first level light intensity of the lighting load is adjustable by activating the external control unit operated by a user; wherein the microcontroller performs with program codes light intensity adjustment in a free-run mode, such that the first time delay $t_{D1}$ of the trigger signal is varied traversing through a first range defined by $T/2<t_{D1}<T-t_{D0}$, the lighting load emits light with gradually varying first level light intensity; wherein the first level light intensity is selected by operating the external control unit to stop the free-run mode at a desired first level intensity.

18. The two-level security light circuit of claim 14, wherein the second level light intensity of the lighting load is adjustable by activating the external control unit operated by a user; wherein the microcontroller performs with program codes light intensity adjustment in a free-run mode, such that the second time delay $t_{D2}$ of the trigger signal is varied traversing through a second range defined by $t_{D0} < t_{D2} < T/2$, the lighting load emits light with gradually varying second level light intensity; the second level light intensity is selected by operating the external control unit to stop the free-run mode at a desired second level intensity.

19. The two-level security light circuit of claim 14, wherein the external control unit is a touch panel, an infrared sensor, a wi-fi signal receiver, a Bluetooth® signal receiver or a push button generating binary signal having a zero and a high level voltage delivered to the microcontroller.

20. The two-level security light circuit of claim 14, wherein the lighting load is a dimmable LED lamp.

21. The two-level security light circuit of claim 14, wherein the first level light intensity is adjusted by the external control unit operated by a user, wherein the adjustment of the first level light intensity is performed by microcontroller with program codes in conjunction with the external control unit in two working modes, which are
  (1) A manual adjustment mode for selecting the first light intensity level in a range of 0%-50% light intensity; and
  (2) A free-run working mode for a preset beginning short time period allowing selection of the first level light intensity from 0% to 50% light intensity when the two-level security light circuit is turned on and the microcontroller fails to identify a preset datum of low level light intensity; wherein if no selection is made during the free-run time period, the microcontroller with program codes automatically performs a preprogrammed level of light intensity as default, and upon intrusion detection the two-level security light circuit switches momentarily to an illumination with the second level light intensity of 100% light intensity.

22. The two-level security light circuit of claim 21, wherein the external control unit is a wall switch, the wall switch is provided in series connected to the AC power source and the two-level security light circuit, the wall switch is operated by turning off momentarily and turning back on to adjust first level light intensity.

23. An universal dimmer integrated with a wall switch, the universal dimmer having on line detection capacity for detecting a time phase of a threshold voltage of a lighting load electrically connected, the universal dimmer comprising:
  a microcontroller with program codes, for operating a search algorithm; and
  an external control unit, coupled to the microcontroller with program codes, being operated by an user to generate at least two types of message carrying signals, recognizable by the microcontroller;
  wherein the first type message carrying signal instructs the microcontroller to perform off-switch function to turn off the lighting load; wherein the second type message carrying signal instructs the microcontroller to perform on-switch function to turn on the lighting load; wherein when the lighting load is turned on, the microcontroller with program codes working in conjunction with a hardware setup instantly detects the time phase of the threshold voltage of the lighting load electrically connected and accordingly establishes a dimmable range compatible with the lighting load electrically connected, wherein the second type message carrying signal further instructs the microcontroller to perform a dimming function for varying the light intensity of the lighting load from zero to a full power illumination;
  wherein the search algorithm is an iteration process to generate a trigger signal with a time delay beginning with a predetermined quantity of time phase increment and then increasing stepwise in each AC half-cycle;
  wherein in an iteration cycle when the trigger signal with the time delay is generated, if the status signal indicates a cutoff state of the lighting load, the search algorithm updates the time delay of the message carrying signal by adding the predetermined quantity of time phase increment to the time delay and then continues the next cycle of iteration process to generate another one of the trigger signal with the updated time delay;
  wherein in the iteration cycle when the trigger signal is generated, if the status signal indicates a conduction state of the lighting load, the search algorithm ends the iteration process and concludes that the latest time delay is the time phase of the threshold voltage of the lighting load.

24. An universal dimmer integrated with a wall switch, the universal dimmer having on line detection capacity for detecting a time phase of a threshold voltage of a lighting load electrically connected, the universal dimmer comprising:
  a microcontroller with program codes, for operating a search algorithm; and
  an external control unit, coupled to the microcontroller with program codes, being operated by an user to generate at least two types of message carrying signals, recognizable by the microcontroller;
  wherein the first type message carrying signal instructs the microcontroller to perform off-switch function to turn off the lighting load; wherein the second type message carrying signal instructs the microcontroller to perform on-switch function to turn on the lighting load; wherein when the lighting load is turned on, the microcontroller with program codes working in conjunction with a hardware setup instantly detects the time phase of the threshold voltage of the lighting load electrically connected and accordingly establishes a dimmable range compatible with the lighting load electrically connected, wherein the second type message carrying signal further instructs the microcontroller to perform a dimming function for varying the light intensity of the lighting load from zero to a full power illumination;
  wherein the search algorithm is an iteration process to generate the trigger signal with the time delay calculated to be between a lower bound and an upper bound, wherein in an iteration cycle the trigger signal with a time delay is generated, if the status signal indicates a cutoff state of the lighting load, the search algorithm updates the lower bound with the time delay of the trigger signal and keeps the upper bound unchanged, and resumes the next cycle of iteration to generate the trigger signal with the time delay calculated to be between the updated lower bound and the unchanged upper bound;
  wherein in an iteration cycle when the trigger signal is generated, if the status signal indicates a conduction state of the lighting load, the search algorithm keeps the lower bound unchanged and updates the upper bound with the time delay of the trigger signal, and resumes the next cycle of iteration to generate the next trigger signal with the time delay calculated to be between the unchanged lower bound and the updated upper bound;

wherein the search algorithm ends the iteration process by a convergent checking with the domain formed by the upper bound and lower bound shrunk to a value equal to or less than a preset minimum range and concludes that the latest upper bound is the latest time delay representing the time phase of the threshold voltage of the lighting load.

* * * * *